(12) United States Patent
Asai

(10) Patent No.: US 7,852,494 B2
(45) Date of Patent: Dec. 14, 2010

(54) IMAGE FORMING APPARATUS AND IMAGE FORMING SYSTEM, IMAGE FORMING METHOD, JOB PROCESSING METHOD, STORAGE MEDIUM AND PROGRAM

(75) Inventor: Hidehiko Asai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 11/189,917

(22) Filed: Jul. 27, 2005

(65) Prior Publication Data
US 2006/0023243 A1     Feb. 2, 2006

(30) Foreign Application Priority Data
Jul. 30, 2004    (JP) .............................. 2004-224580

(51) Int. Cl.
*G06F 3/12* (2006.01)
*G06F 15/00* (2006.01)
*G06K 1/00* (2006.01)
*H04N 1/46* (2006.01)

(52) U.S. Cl. ...................... 358/1.1; 358/1.13; 358/1.15; 358/501

(58) Field of Classification Search .................. 358/1.1, 358/1.13, 1.15, 501
See application file for complete search history.

(56) References Cited

U.S. PATENT DOCUMENTS

| | | | | |
|---|---|---|---|---|
| 4,963,920 A | * | 10/1990 | Fukushima | .................. 355/40 |
| 4,975,740 A | | 12/1990 | Takemura et al. | ........... 355/202 |
| 5,751,448 A | * | 5/1998 | Kim et al. | .................... 358/498 |
| 5,954,436 A | * | 9/1999 | Kageyama et al. | .......... 400/188 |
| 6,285,460 B1 | * | 9/2001 | Koh et al. | ................... 358/1.18 |
| 2002/0051203 A1 | * | 5/2002 | Kizaki | ........................ 358/1.16 |
| 2003/0061322 A1 | * | 3/2003 | Igarashi et al. | ............... 709/223 |
| 2003/0103777 A1 | * | 6/2003 | Nakamura et al. | ............. 399/82 |
| 2003/0137701 A1 | * | 7/2003 | Shimizu | ..................... 358/474 |
| 2006/0153615 A1 | * | 7/2006 | Kamei | .......................... 400/62 |

FOREIGN PATENT DOCUMENTS

| | | |
|---|---|---|
| JP | 2-106778 | 4/1990 |
| JP | 9-190115 | 7/1997 |

* cited by examiner

*Primary Examiner*—Twyler L Haskins
*Assistant Examiner*—Fan Zhang
(74) *Attorney, Agent, or Firm*—Fitzpatrick, Cella, Harper & Scinto

(57) ABSTRACT

A job processing method for an image forming system having an image forming apparatus capable of print-outputting additional information of a job on a sheet where image data of the job, stored in a storage unit capable of storing plural page job data, is print-outputted. Information related to an operating condition of the image forming apparatus is confirmed, and based on the information, the image forming apparatus is caused to operate in one of a first mode to print-output additional information, generated without an operator's intervention operation, on the sheet, and a second mode to print-output additional information, generated via the operator's intervention operation, on the sheet.

18 Claims, 26 Drawing Sheets

FIG. 6A
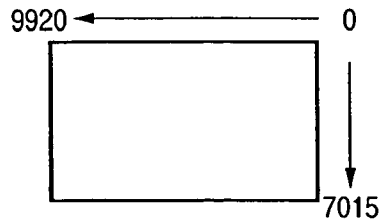
FIG. 6B 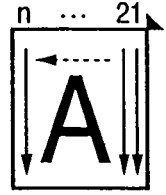 → FIG. 6C 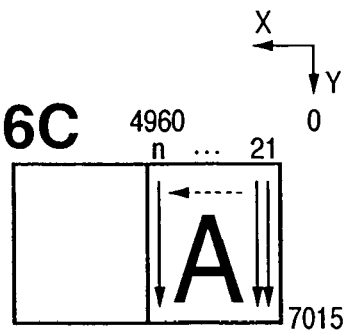
FIG. 6D 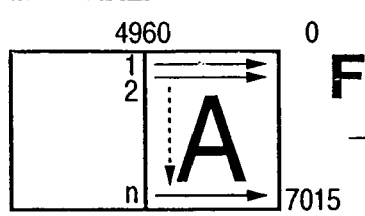 FIG. 6E 
FIG. 6F 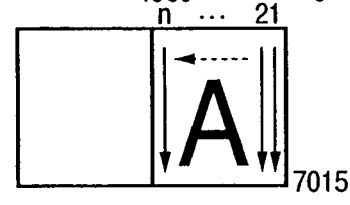 FIG. 6G 
FIG. 6H 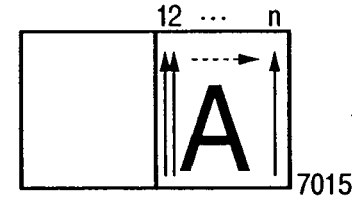 FIG. 6I 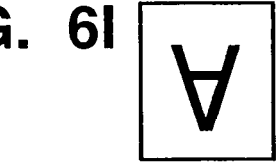
FIG. 6J 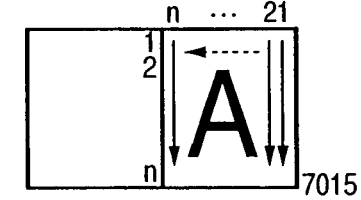 FIG. 6L 

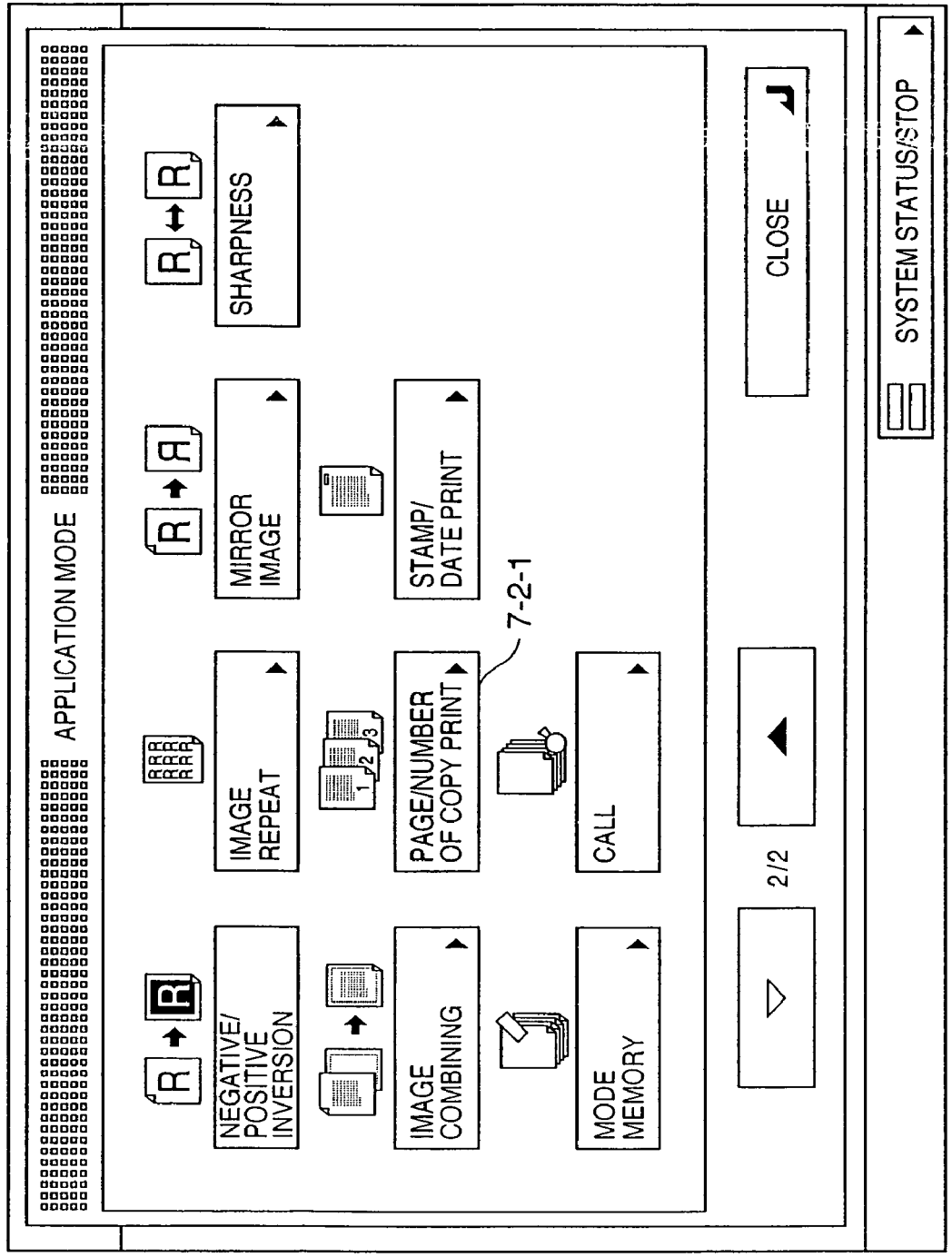

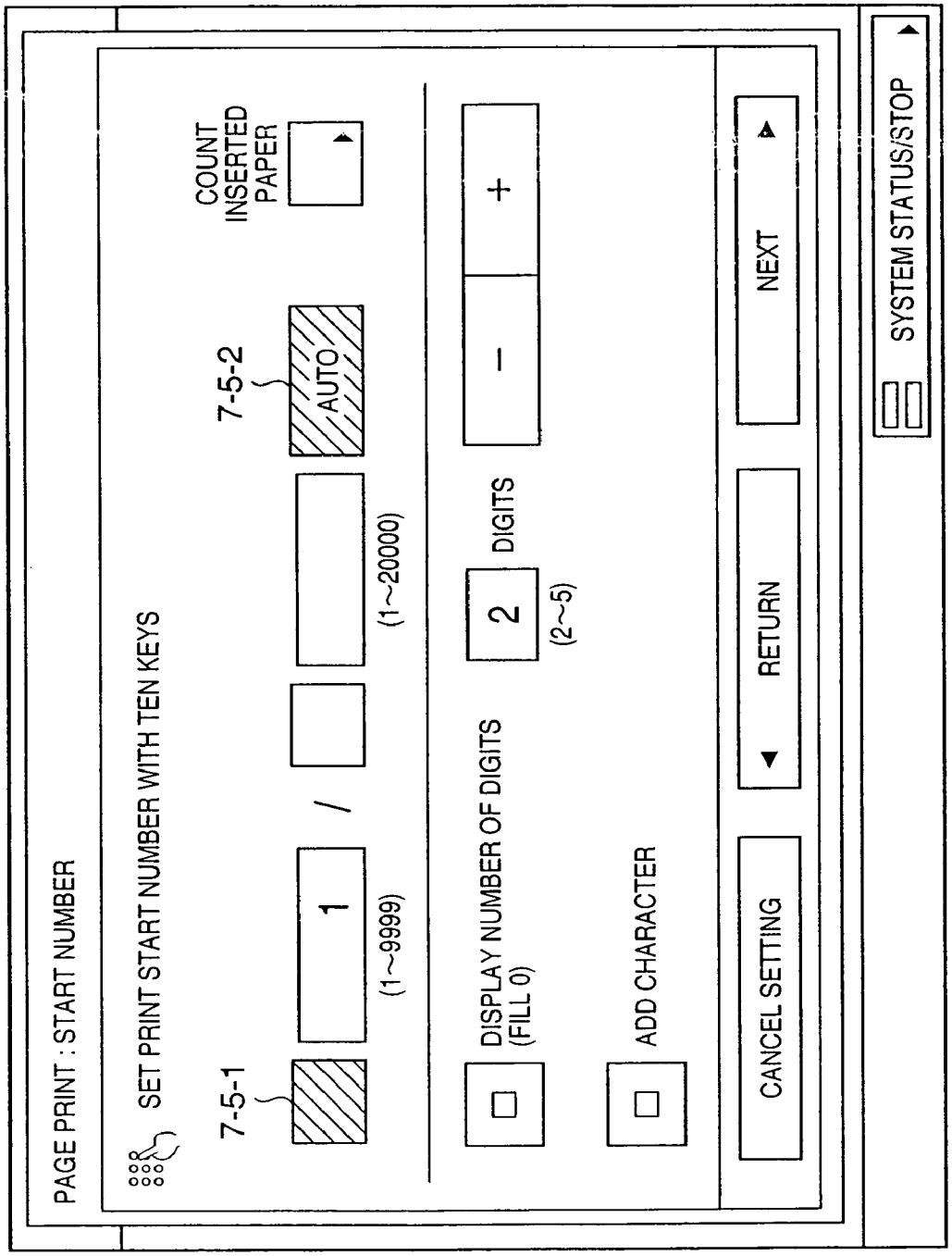

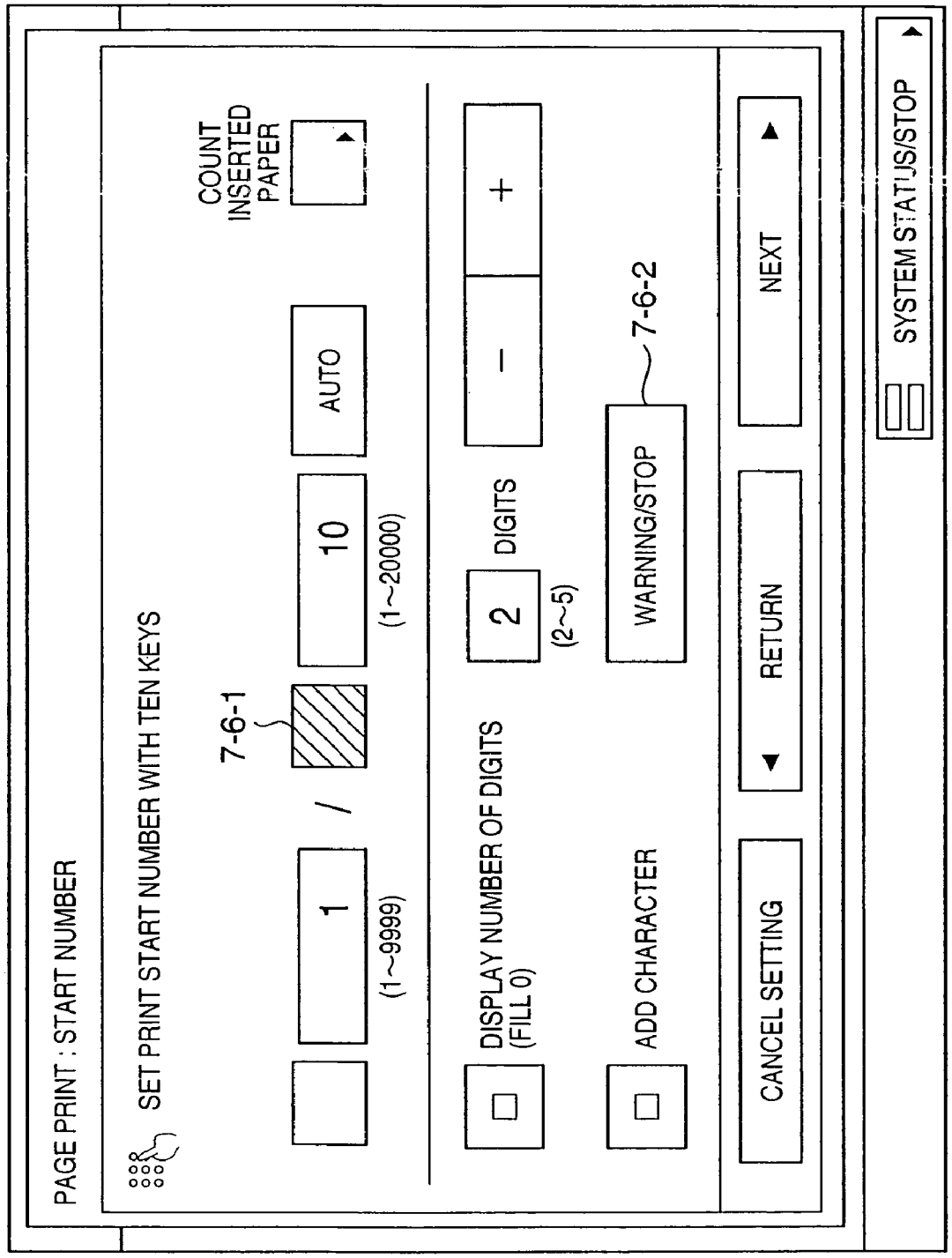

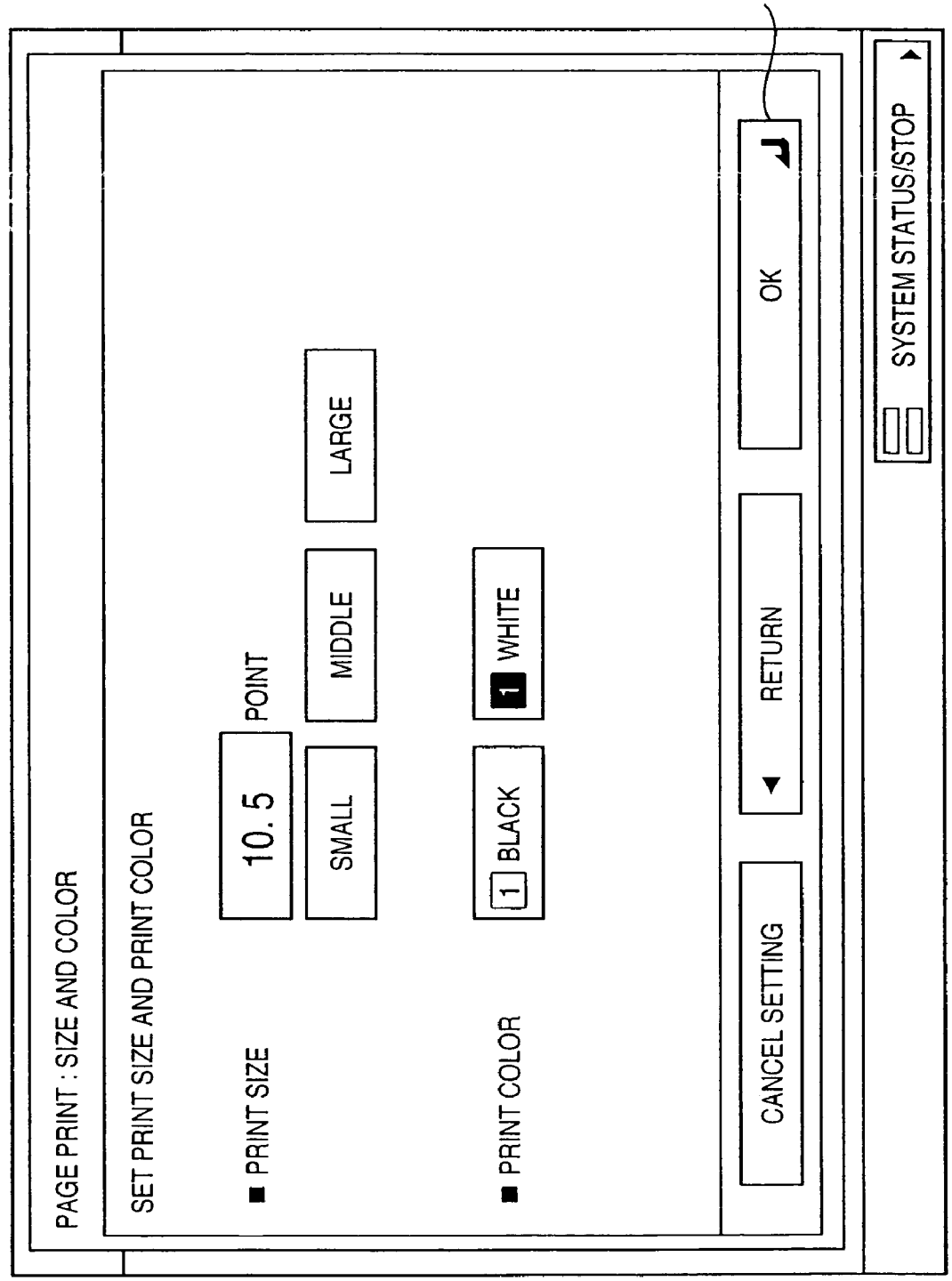

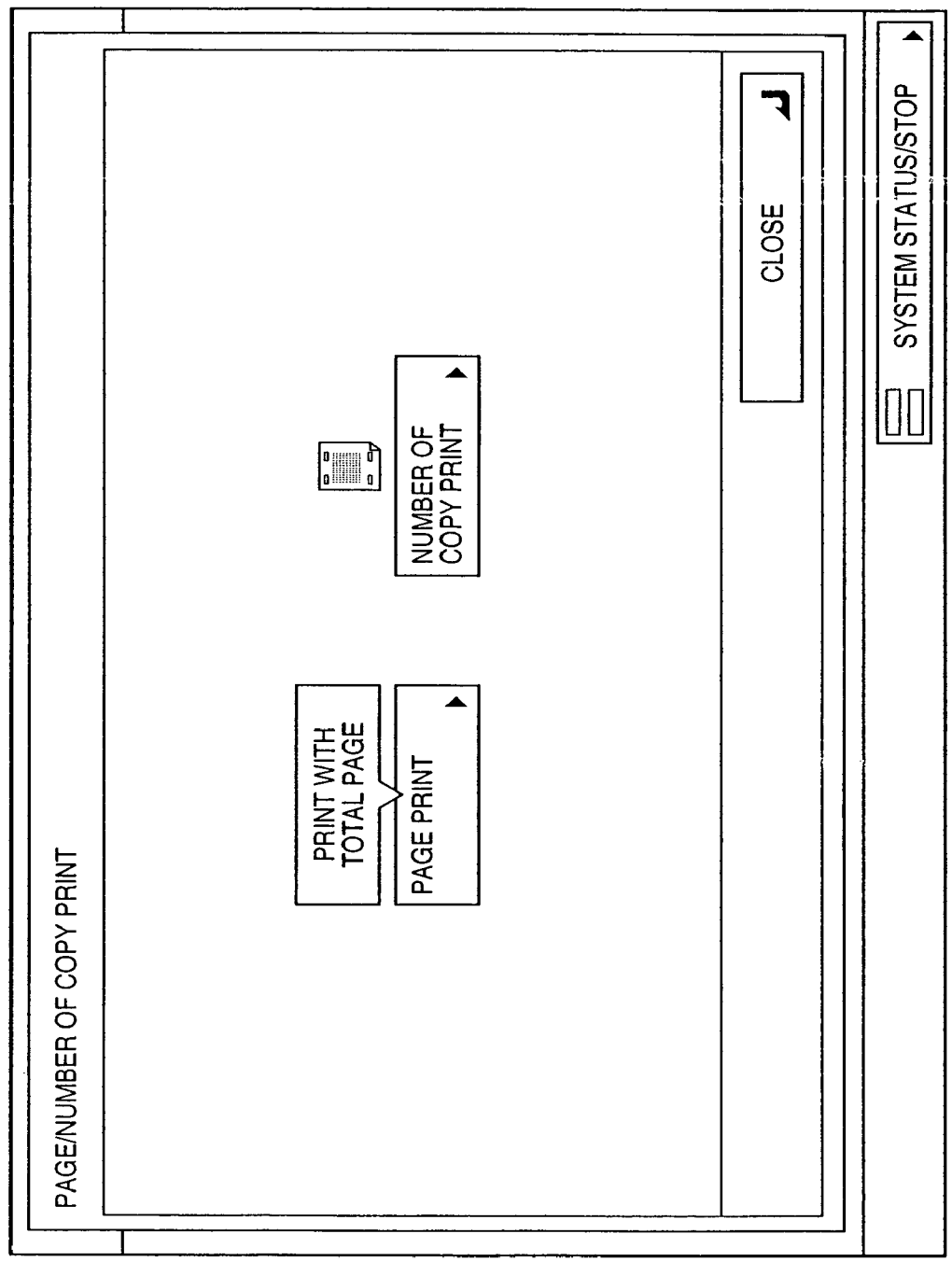

IMAGE FORMING APPARATUS AND IMAGE FORMING SYSTEM, IMAGE FORMING METHOD, JOB PROCESSING METHOD, STORAGE MEDIUM AND PROGRAM

FIELD OF THE INVENTION

The present invention relates to an image forming apparatus and an image forming system, a job processing method, a storage medium and a program, and more particularly, to an image forming apparatus capable of attaching additional information such as page number on a sheet where an image is formed.

BACKGROUND OF THE INVENTION

In recent years, as an image forming apparatus such as a copier, an apparatus having a numbering function of attaching additional information such as page number to recording paper where a document image is printed has been proposed. As the numbering function, in addition to simple addition of page numbers, a numbering function indicating current page to the total number of document pages, such as (page number)/(total number of pages) (referred to as a "recording of page number with total number of pages"), has been proposed. Japanese Patent Application Laid-Open Nos. 02-106778 and 09-190115 disclose apparatuses to perform the recording of page number with total number of pages.

According to Japanese Patent Application Laid-Open No. 02-106778, to count the total number of document pages, first, a document transfer operation is performed by using an automatic document feeder (ADF) so as to transfer the documents set on a document table, while the number of document pages is incremented upon transfer of each page. The total number of documents as plural pages is counted by repeating the operation until there is no document to be transferred. When the counting of the total number of document pages has been completed, to print the document images on recording paper, the documents, transferred by the ADF at the previous process, are transferred by the ADF again. Upon this transfer, the image forming apparatus reads document images, prints the read images on recording paper, while prints document page numbers and total number of document pages, obtained at the previous process, on the recording paper.

Further, according to Japanese Patent Application Laid-Open No. 09-190115, numbering is performed by using the total number of document pages previously set by a user.

In the apparatus in Japanese Patent Application Laid-Open No. 02-106778, where the total number of document pages is counted in advance by using the ADF, the document transfer operation is performed twice on the same document. That is, (i) the document transfer operation by the ADF for counting the total number of document pages and (ii) the document transfer operation by the ADF for actually printing document images on recording paper are performed. As the documents are transferred with rollers and belt, the incidence of document jam at the ADF may be higher in comparison with other arrangements where the frequency of document transfer is lower. Further, such document jam damages the documents themselves. Further, time for counting the total number of documents is increased in accordance with increase in the number of documents. Further, in an image forming apparatus which lacks an ADF, it may be impossible to count the total number of document pages.

In the apparatus in Japanese Patent Application Laid-Open No. 09-190115, where the number of document pages is inputted by a user in advance, as the counting of the total number of documents is unnecessary, time by the end of printing can be reduced. However, it is necessary for the user to visually check the total number of document pages before execution of image formation. Accordingly, there are possibilities of user's miscount and undesirable image formation by the image forming apparatus due to an erroneous operation by the user's miscount. Further, when the total number of document pages is so large, the user's counting work is heavier in comparison with a case where the total number of document pages is small.

SUMMARY OF THE INVENTION

The present invention provides an image forming apparatus, an image forming system, a job processing method, a storage medium and a program, to address the problems assumed in the above-described conventional art.

Accordingly, an object of the present invention is to address the problem caused by the apparatus as disclosed in Japanese Patent Application Laid-Open No. 02-106778 and to address the problem caused by the apparatus as disclosed in Japanese Patent Application Laid-Open No. 09-190115. Further, the present invention provides an image forming apparatus, an image forming system, a job processing system, a storage medium and a program, to realize reduction of user's labor, prevention of misprint, prevention of deterioration of document, improvement in productivity, and reduction of load on apparatus, in a balanced manner, and to meet users' various needs.

According to an aspect of the present invention, provided is a job processing method for an image forming system having an image forming apparatus capable of print-outputting additional information of a job on a sheet where image data of the job, stored in a storage unit capable of storing plural page job data, is print-outputted, the method comprising: confirming information related to an operating condition of the image forming apparatus; and causing the image forming apparatus, based on the information, to operate in one of a first mode to print-output additional information, generated without an operator's intervention operation, on the sheet, and a second mode to print-output additional information, generated via the operator's intervention operation, on the sheet.

According to another aspect of the present invention, provided is a job processing method for an image forming system having an image forming apparatus capable of print-outputting additional information of a job on a sheet where image data of the job, stored in a storage unit capable of storing plural page job data, is print-outputted, the method comprising: selectively enabling a first mode to print-output additional information, generated without an operator's intervention operation, on the sheet, and a second mode to print-output additional information, generated via the operator's intervention operation, on the sheet; in the first mode, causing the image forming apparatus to start a print operation for the job when all the image data of a job to be processed has been stored in the storage unit; and in the second mode, causing the image forming apparatus to start the print operation for the job before all the image data of the job has been stored in the storage unit.

According to another aspect of the present invention, provided is a job processing method for an image forming system having an image forming apparatus capable of print-outputting additional information of a job, corresponding to the total number of the job, on a sheet where image data of the job, stored in a storage unit capable of storing plural page job data, is print-outputted, the method comprising: enabling an operation mode to print-output additional information, generated based on information from a counter unit configured to count the number of pages of the job, on the sheet; and upon execution of the operation mode, causing the image formation apparatus to start a print operation for the job when all the image data of the job to be processed has been stored in the storage unit, and in parallel with storage of the image data of the job into the storage unit, to perform a count operation by the counter unit for generation of the additional information.

According to an aspect of the present invention, provided is a job processing method for an image forming system having an image forming apparatus capable of print-outputting additional information of a job, corresponding to the total number of the job, on a sheet where image data of the job, stored in a storage unit capable of storing plural page job data, is print-outputted, the method comprising: enabling an operation mode to print-output additional information, generated based on information related to the number of pages of the job inputted by an operator via an operation unit, on the sheet; and upon execution of the operation mode, causing the image forming apparatus to perform a print operation for the job in parallel with storage of image data of the job into the storage unit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A to 6L are explanatory views of image reading and image output into/from a memory in the copier according to the embodiment;

FIGS. 10A to 10D are examples of user interface for setting operation upon recording of page number with total number of pages according to the embodiment;

FIGS. 11A to 11D are examples of user interface for setting operation upon recording of page number with total number of pages according to the embodiment;

FIGS. 12A to 12C are examples of user interface for setting operation upon recording of page number with total number of pages according to the embodiment;

DETAILED DESCRIPTION OF THE PREFERRED EMBODIMENT

A preferred embodiment of the present invention will now be described in detail in accordance with the accompanying drawings.

Figure 1:
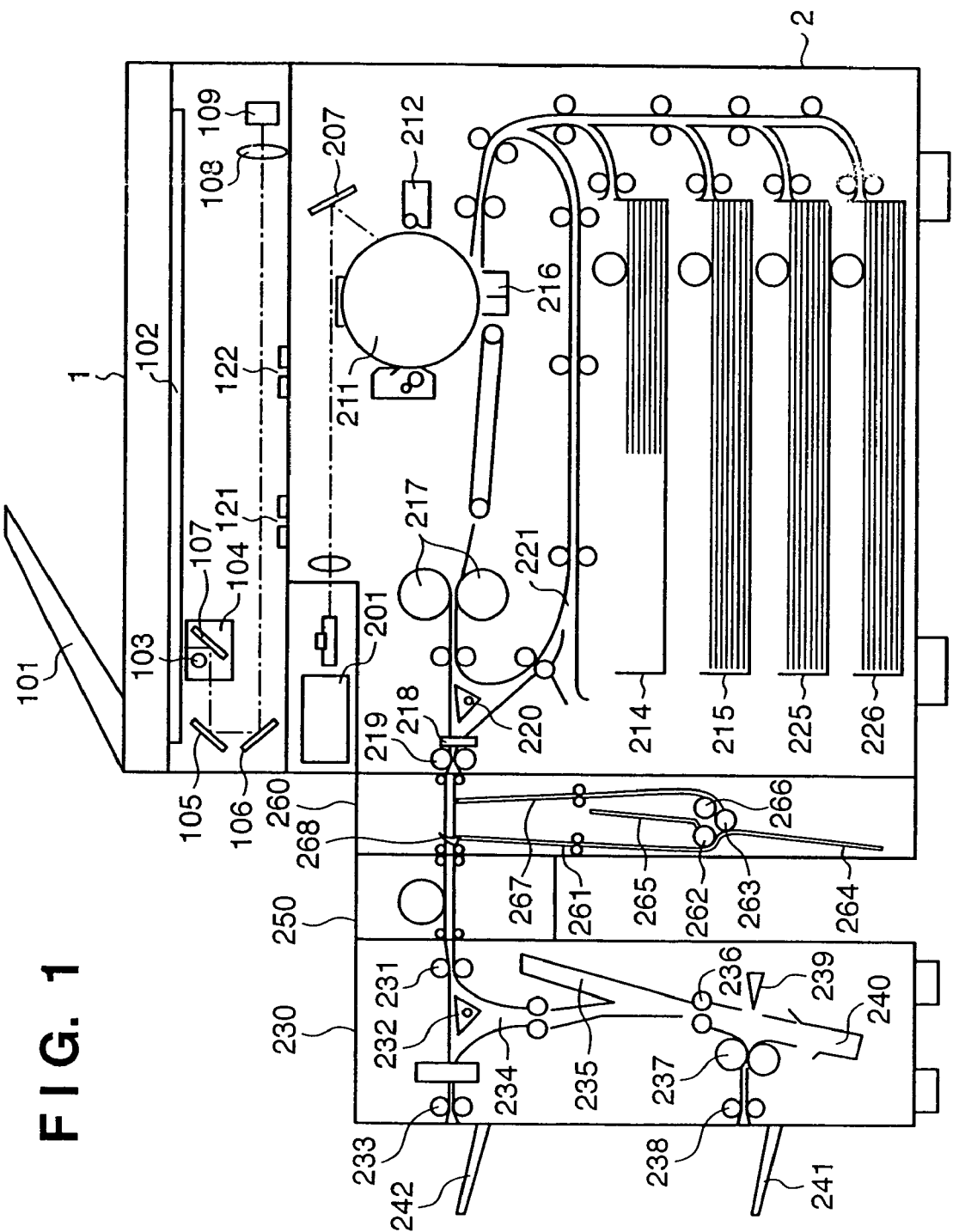
FIG. 1 is a schematic cross-sectional view showing the structure of a copier according to an embodiment of the present invention.

FIG. 1 is a schematic cross-sectional view showing the structure of an image forming apparatus (copier) according to an embodiment of the present invention. The image forming apparatus mainly has a reader 1 and a printer 2. Hereinbelow, the constructions and operations of respective units will be described. Note that in the present embodiment, the image forming apparatus will be described mainly as a copier having a copying function, however, the present invention is not limited to the copier. For example, the image forming apparatus may have a print function capable of printing based on image data outputted from a computer, or may be a multi-function type image forming apparatus having plural functions including at least any of the copying function, the print function and a facsimile function, or may be a single-function type image forming apparatus having only one of these functions.

Documents, placed on a document feeding unit 101 (ADF 101), are transferred onto a document glass plate 102 one by one.

Note that the image forming apparatus of the present embodiment is capable of performing image forming processing in first-page processing (first-page mode). In the first-page mode, a bunch of documents as plural pages, set on the ADF 101, are sequentially fed by the ADF 101 one by one from the first page side (first page), then subjected to document reading processing, stored into a memory, and subjected to print processing, sequentially from the first page. Upon printing in the first-page mode, to maintain the order of the pages of the printed result, the image forming apparatus performs face-down processing. In the face-down processing, recording paper on which an image is formed is inverted by an inversion unit in the apparatus, then the recording paper, with its first surface (front surface) faced down, is discharged to the outside of the apparatus, is sequentially stacked, with the first surface faced down, on a paper discharge unit outside the apparatus. Further, when sheet process such as staple processing is performed on the recording paper, the image-formation processed recording paper, transferred via the inversion unit with the first surface faced down, is stacked on a tray in the apparatus, sequentially from the first page. When the recording paper as the last page has been stacked on the tray, the staple processing is performed on the bunch of recording paper on the tray by a stapler (not shown) (The stapler drives a staple on the rear end side of the bunch of recording paper from the first page). Then, the stapled bunch of recording paper is discharged to the paper discharge unit. The above print operation is similarly performed in an ADF reading mode using the ADF 101 and in an MDF reading mode (to be described later) by manual document feeding.

Note that the present embodiment is applicable to an image processing apparatus capable of performing last-page processing (last-page mode for sequentially performing the above respective processings in the first-page mode from the last page side). Further, the embodiment is applicable to an image forming apparatus having both modes.

When the document is transferred to a predetermined position on the glass plate 102, a lamp 103 of a scanner is turned on, then a scanner unit 104 moves while irradiates the document with light. The reflected light from the document is inputted, via mirrors 107, 105, 106, and a lens 108, into a CCD image sensor (CCD) 109.

Note that the supply of document onto the glass plate (platen glass) 102 may be performed by a user's manually setting a document on the glass plate 102 without using the document feeding unit 101. The image forming apparatus 1 of the present embodiment has the ADF reading mode for document reading via document feed operation by the ADF 101, and also has the MDF reading mode for reading an image of document, set by the user, with a document reading surface to the scanner 104 side (with the surface where an image is formed is faced down), without the document feed operation by the ADF 101. Note that it may be arranged such that the image forming apparatus has at least any one of these reading modes.

Figure 2:
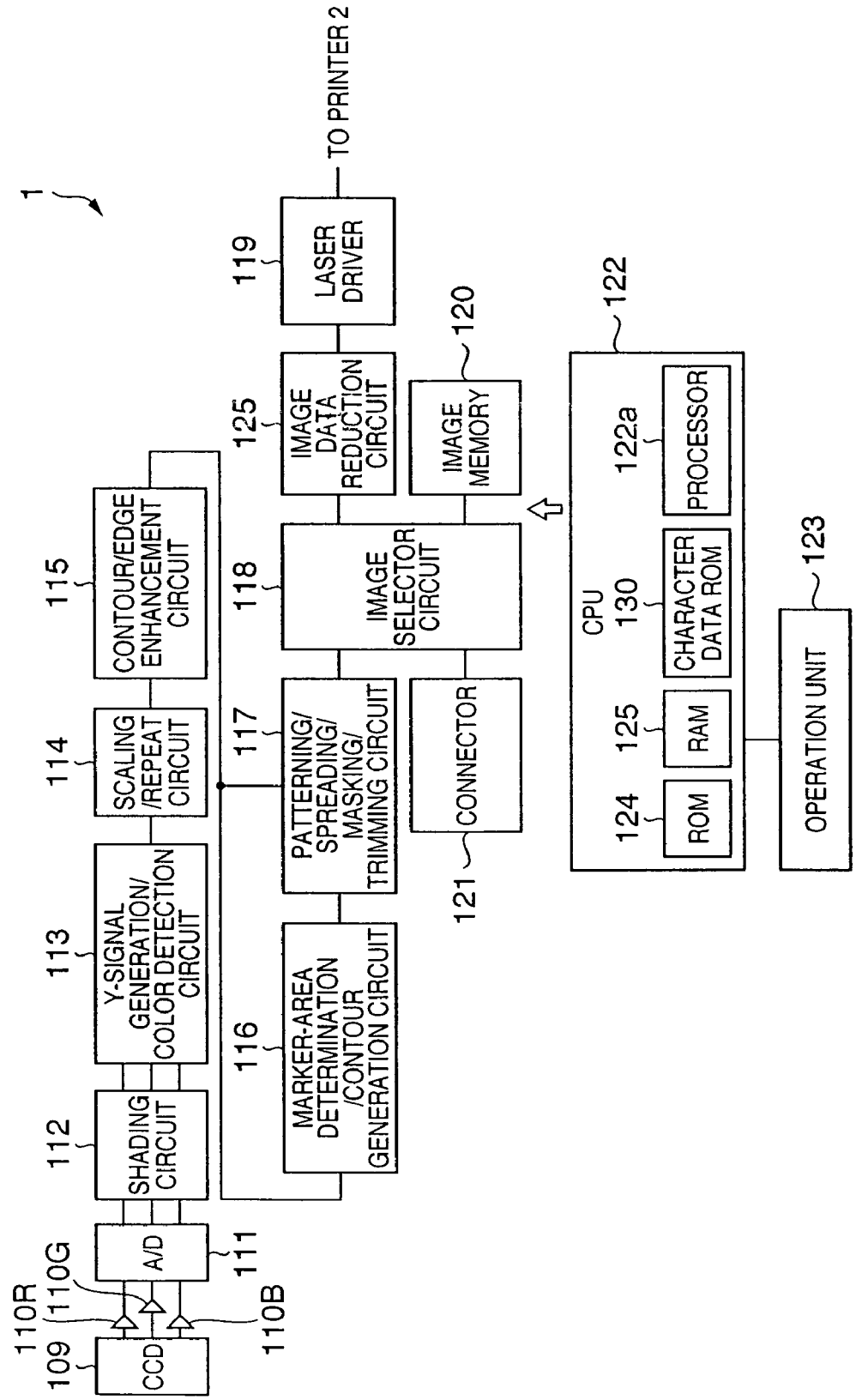
FIG. 2 is a block diagram showing the construction of an image processing unit of the copier according to the embodiment.

FIG. 2 is a block diagram showing the signal processing construction of the reader 1. Hereinbelow, the signal processing construction and operation of the reader 1 will be described.

The reflected light from the document, inputted in the CCD 109, is photoelectric-converted to red, green and blue color electric signals. The respective color electric signals from the CCD 109 are amplified in correspondence with the input signal levels of an A/D converter 111 by the amplifiers 110R, 110G and 110B. The A/D converter 111 converts the analog electric signals from the amplifiers 110R, 110G and 110B into digital signals and outputs them. The output signals from the A/D converter 111 are inputted into a shading circuit 112, in which unevenness of light-distribution by the lamp 103 and unevenness of sensitivity of the CCD 109 are corrected. The signals from the shading circuit 112 are inputted into an Y-signal generation/color detection circuit 113.

A Y-signal generation circuit of the Y-signal generation/color detection circuit 113 obtains a Y-signal by calculation on the signals from the shading circuit 112, using the following expression $$Y=0.3R+0.6G+0.1B.$$

Further, a color detection circuit of the Y-signal generation/color detection circuit 113 divides the R, G and B signals to 7 color signals and output the signals. The output signals from the Y-signal generation/color detection circuit 113 are inputted to a scaling/repeat circuit 114. A scaling circuit of the scaling/repeat circuit 114 performs image scaling processing, by controlling the scanning speed of the scanner unit 104 in scaling in a subscanning direction and by data interpolation processing in a main scanning direction. Further, a repeat circuit of the scaling/repeat circuit 114 enables output of plural same images. A contour/edge enhancement circuit 115 performs edge enhancement and obtains contour information by enhancing high frequency components of the signals from the scaling/repeat circuit 114. The signals from the contour/edge enhancement circuit 115 are inputted into a marker-area determination/contour generation circuit 116, and a patterning/spreading/masking/trimming circuit 117.

The marker-area determination/contour generation circuit 116 reads a portion marked with a marker pen in a designated color on a document, generates marker contour information. Then the patterning/spreading/masking/trimming circuit 117 performs spreading, masking, trimming and the like based on the contour information. Further, the circuit 117 performs patterning by the color detection signals from the Y-signal generation/color detection circuit 113.

When the output signals (image data) from the patterning/spreading/masking/trimming circuit 117 are outputted to the printer 2, the signals are inputted from an image selector 118 to be described later, via an image data reduction circuit 125, into a laser driver 119. The laser driver 119 converts the signals subjected to the various processings into signals to drive laser. The output signals from the laser driver 119 are inputted into the printer 2, and image formation is performed based on the signals to form a visible image. On the other hand, the image selector 118 forwards the output from the circuit 117 to the image memory 120, thereby the image data is stored into the image memory 120.

In the image memory 120, the image data sent from the image selector 118 can be stored in a designated position in accordance with a direction by a CPU 122. The data storage status in the image memory 120 will be described later with reference to FIG. 7. Further, the order of storage into the image memory 120 and the order of reading from the image memory 120 are controlled as described later with reference to FIG. 6, thereby functions of performing image rotating processing and image combining on the memory are realized.

Note that the image memory 120 includes a large-capacity storage unit such as a hard disk. Plural job data each having plural pages (plural series of image data) are stored in the storage unit. The job data from the scanner is print-outputted via the hard disk. Further, in a case where the image forming apparatus is a multifunction type apparatus, image data outputted from a computer is also print-outputted by the printer via the hard disk. In this manner, various data can be stored into the image memory 120.

Further, since the large-capacity image memory 120 is employed, the image forming apparatus of the present embodiment can receive a plural-page job data even when image data as another plural-page job is read out from the memory and print processing is performed. The print processing for the preceding job data and input processing and storage processing for the subsequent job data can be performed simultaneously (in parallel). Further, the image forming apparatus 1 has a transmission function of transmitting job data, read from the image memory 120, to an external device (computer or another image forming apparatus). The image forming apparatus is capable of simultaneously performing the transmission processing by its transmission unit and the print processing by its printer. The CPU 122 performs job control for execution of these various processings.

The construction around a video bus in the reader 1 is as described above. The CPU 122 controls the units around the video bus (the reader 1 (the reading by the CCD 109, the image processing, and the image storage/output by the image selector 118), and the printer 2), and the construction around a CPU bus (connector 121, an operation unit 123 and the like).

Figure 4:
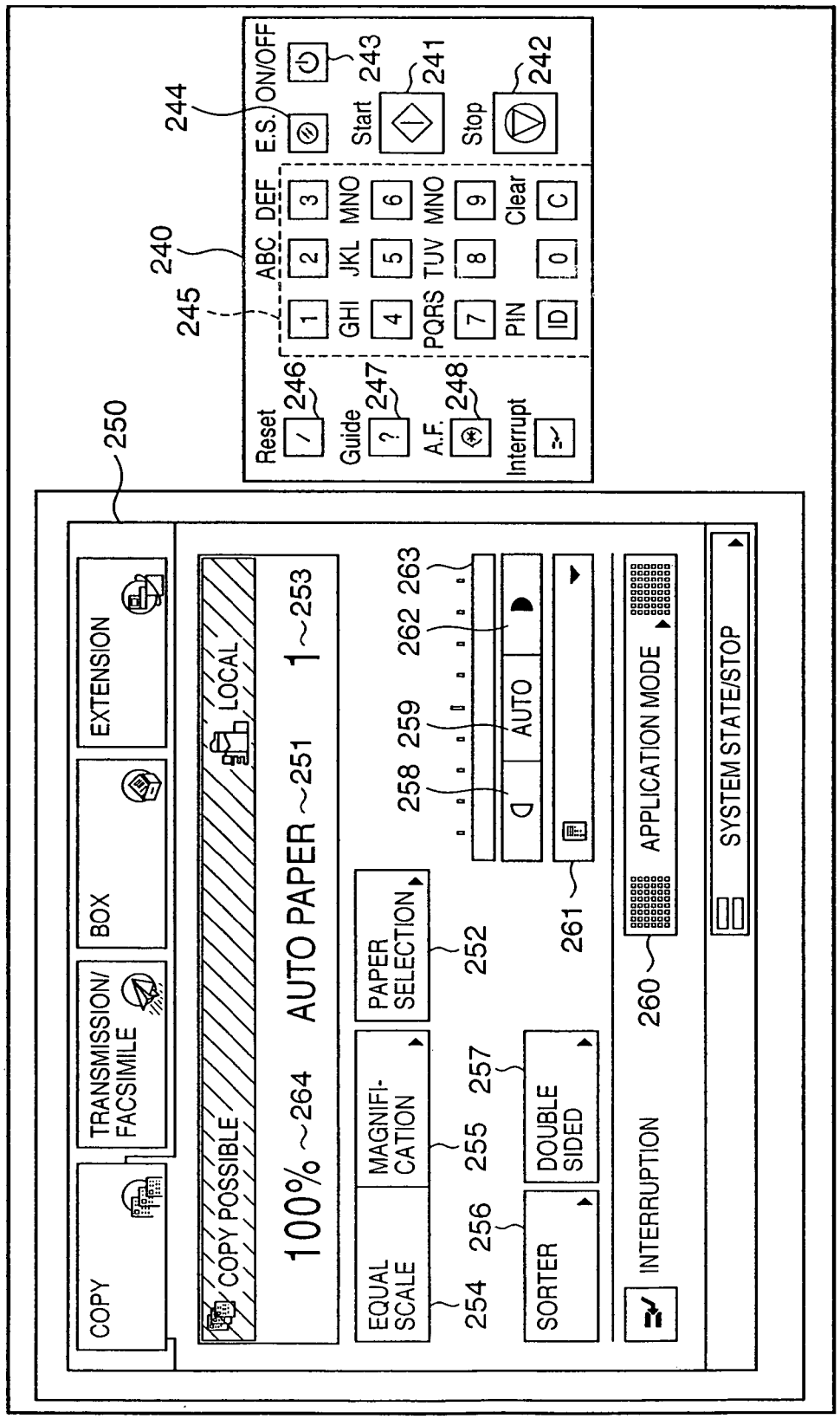
FIG. 4 is an example of an operation unit of the copier according to the embodiment.

The operation unit 123 has various key groups for designation of image editing in the image processing, image forming operation such as designation of the number of copies, and a display unit to display the content of operation. FIG. 4 shows the details of the operation unit 123. The operation unit 123 has various keys, and a liquid crystal display unit 250 having a dot matrix as a liquid crystal display device. The liquid crystal display unit 250 is a touch panel where key-input is made by depression of key display portion. A hard key group 240 includes various hard keys. A "Start" key 241 is used for copy start, and a "Return" key 246 is used for resetting a set mode to a normal state.

Further, the key group 245 includes 0 to 9 ten keys for input of zoom ratio and the like and a "Clear" key for cancellation of the input. The number of copies, designated with the key group, is displayed on a number of copies display 253 of the liquid crystal display unit 250. A "Guide" key 247 is used for display of function guide screen explaining the various functions. A "user mode" key 248 is used for various settings of the apparatus.

Figure 5A:
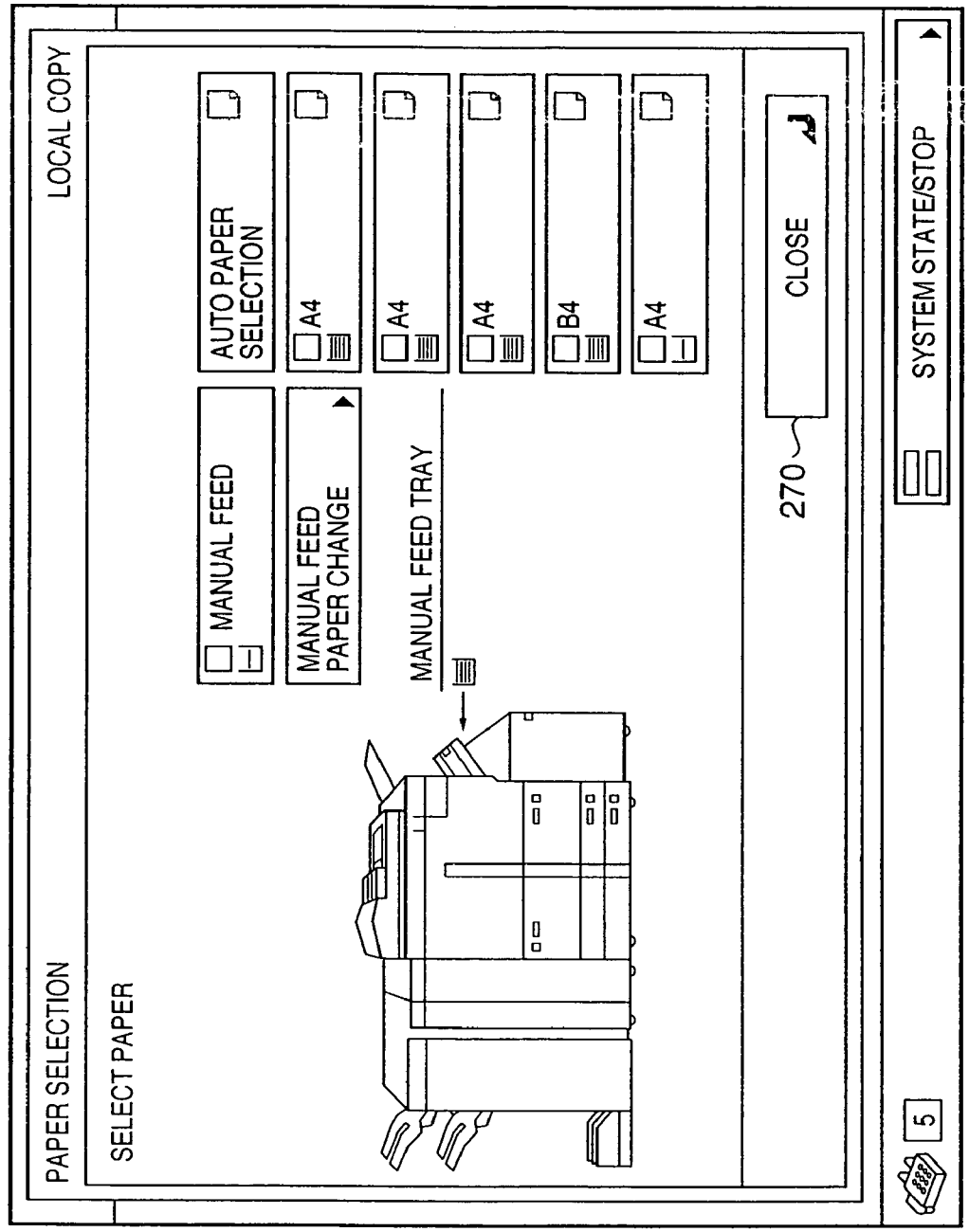
FIGS. 5A and 5B are examples of display screens on a liquid crystal display unit of an operation unit 123 in FIG. 2.

The liquid crystal display unit 250 displays an apparatus status, the number of copies, magnification, selected paper and various operation screens. The liquid crystal display unit 250 also displays touch keys. A key 252 is used for selection of paper-feed tray and auto paper selection. When the key 252 is depressed, a paper selection screen as shown in FIG. 5A is displayed. In this screen, when a paper feed tray is selected and a "close" key 270 is depressed, the screen is closed, and the result of selection is displayed on the paper display 251 of the liquid crystal display unit 250. Keys 258 and 262 are used for density adjustment. The density is displayed on a density display 263 of the liquid crystal display unit 250. A Key 259 is a key for turning ON/OFF an auto density-adjustment function and its display.

Figure 5B:
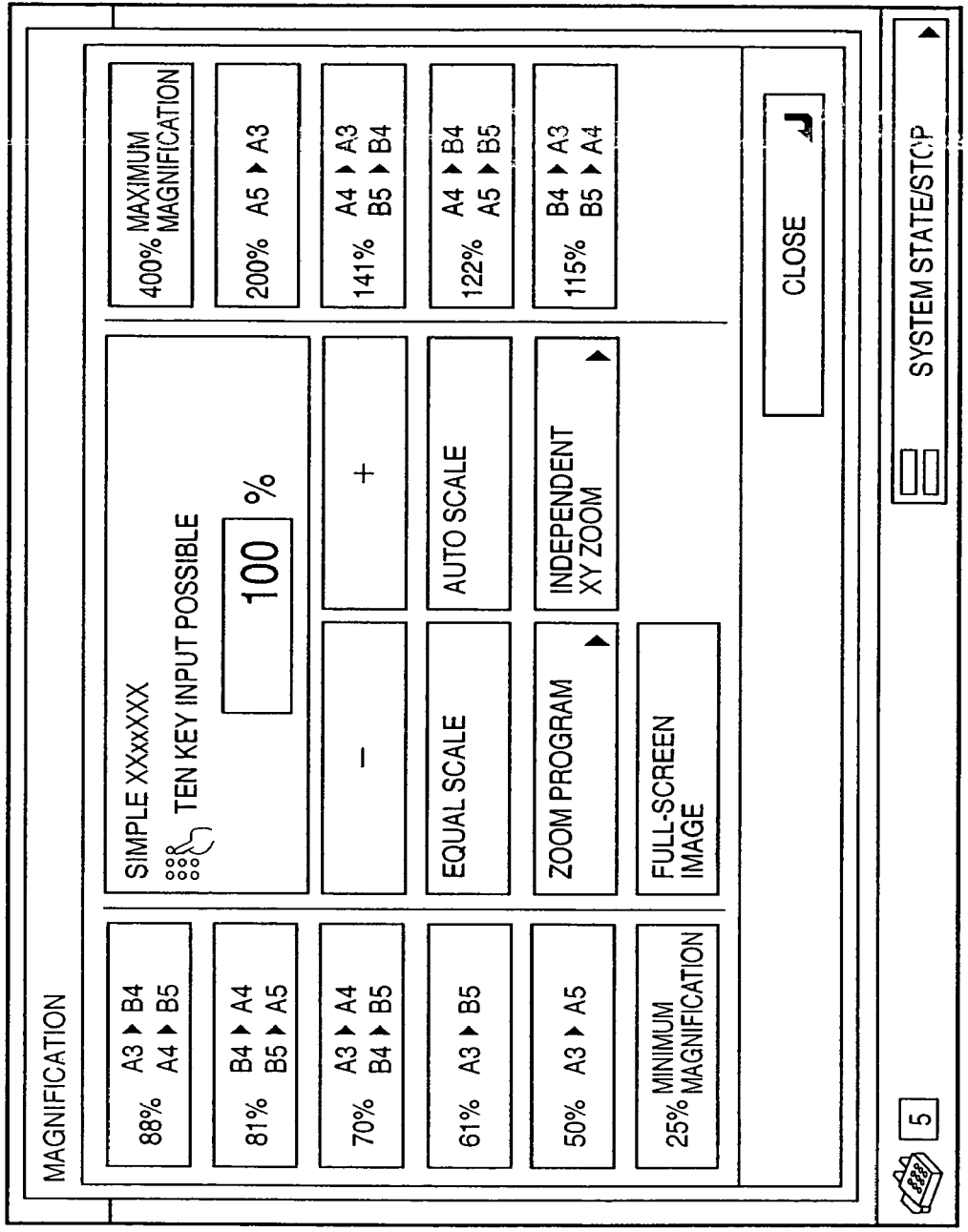

Keys 254 and 255 are used for setting equal-scale and reduction/enlargement. When the key 255 is depressed, a magnification setting screen as shown in FIG. 5B is displayed for detailed reduction/enlargement setting. The magnification is also displayed on a magnification display 264 of the liquid crystal display unit 250. A key 260 is an application mode key. When the key 260 is depressed, a various mode setting screens are displayed. As one of the application modes, "recording of page number with total number of pages" can be selected.

The CPU circuit 122 controls the entire apparatus including the reader 1 and the printer 2. The CPU circuit 122 controls the plural units included in the image forming apparatus. The CPU circuit 122 has a microprocessor 122a, a ROM 124 holding control programs and the like executed by the microprocessor 122a, a RAM 125 utilized as a work area or the like upon execution of various programs by the microprocessor 122a, various timer controllers (not shown) and the like. Further, the CPU circuit 122 performs processing in flowcharts to be described later and display control of operation screens displayed on the display unit 123, as shown in the respective figures. Note that in the following description, the CPU circuit 122 will also be referred to as a controller.

Figure 9:
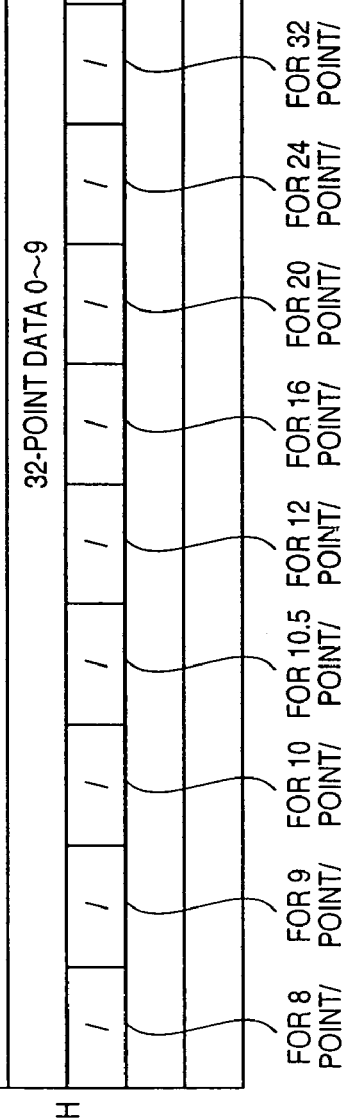
FIG. 9 is a table showing an example of data structure in a character data ROM according to the embodiment.

A character data ROM 130, which is a ROM for storing character images and the like, holds image data of figures and the like in a structure as shown in FIG. 9. The CPU circuit 122 reads character data stored in the ROM 130 based on a character code to be print-outputted, and maps the data as bitmap image data on the image memory 120. Further, image data stored in the image storage RAM (e.g., memories 1 to 100 in FIG. 7) can be mapped on the image memory under the control of the CPU circuit 122.

Figure 3:
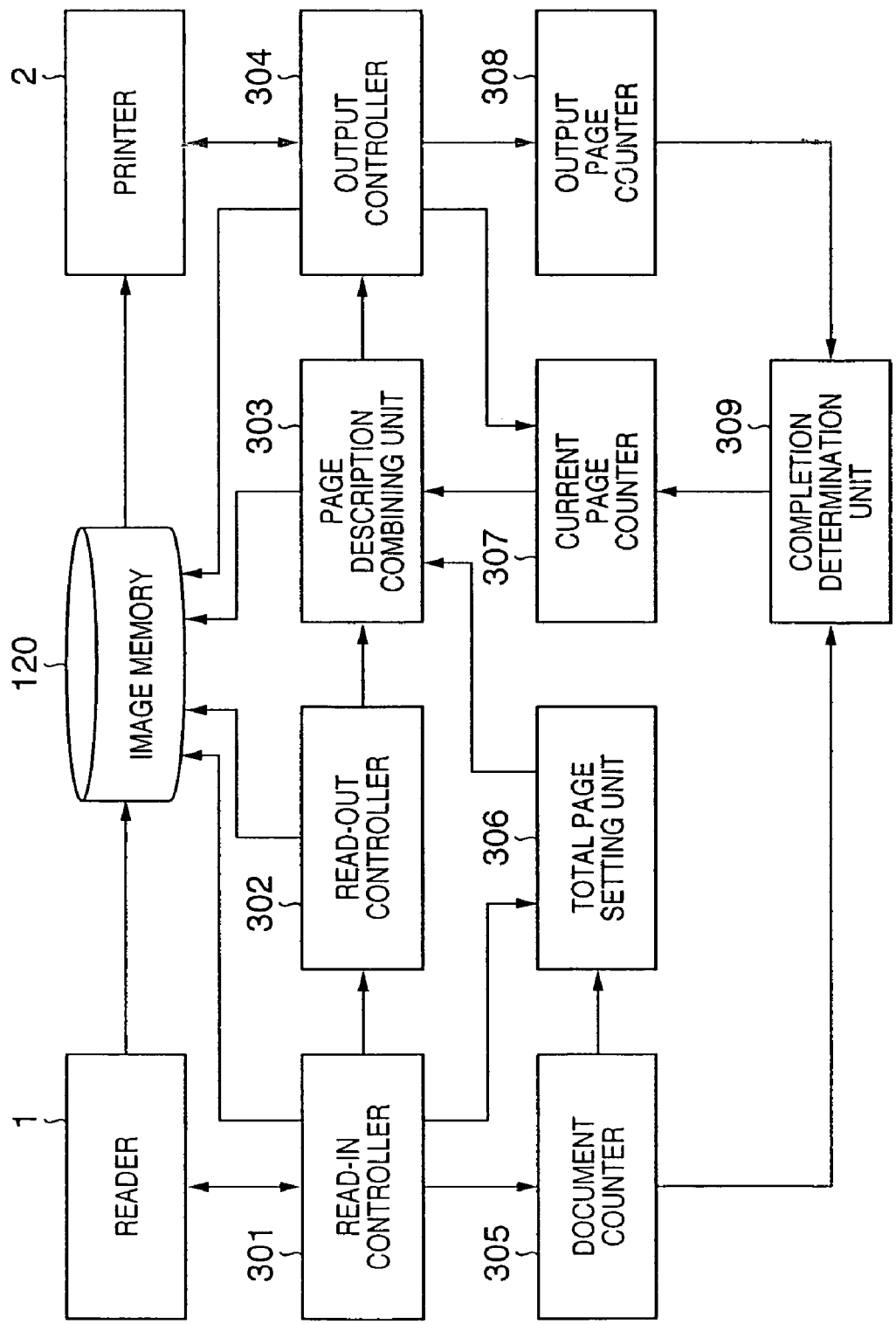
FIG. 3 is a block diagram explaining connection between a CPU circuit and respective units in the copier according to the embodiment.

FIG. 3 is a block diagram showing the functional construction to realize the "recording of page number with total number of pages" according to the present embodiment. Hereinbelow, the outline of the processing of the recording of page number with total number of pages will be described with reference to FIG. 3. Note that the respective functions 301 to 309 are realized by execution of the control programs stored in the ROM 124 by the microprocessor 122a in the CPU circuit 122.

In the present embodiment, as the "recording of page number with total number of pages" function (page print mode), the image forming apparatus has an automatic mode and a manual mode, selectively executable by an operator. In the automatic mode, read document images are stored into the image memory while the number of documents is counted, and the number of documents upon completion of reading of all the documents is set to the total number of pages. Then, print-output of the document images with recording of page number with total number of pages, using the set total number of pages, is started. On the other hand, in the manual mode, recording of page number with total number of pages, using the total number of pages manually set prior to document reading, is performed. Accordingly, in the manual mode, print-output of document image can be performed before completion of reading of all the documents.

In this manner, in the page print mode, the image forming apparatus of the present embodiment enables print-output of total page information (additional information) corresponding to the total number of pages of a series of document data (job) (total number of document pages) on a sheet where a document image with a page number is printed. In the automatic mode, the total page information is automatically (without the operator's input of the total number of documents to be processed by the page print function) generated, through the document count operation using the ADF or the like.

In this manner, the image forming apparatus of the present embodiment includes a unit to count the number of documents (ADF 101, a document counter or the like). In the automatic mode, the CPU circuit 122 performs the document count processing by the unit, thereby obtains the total page information of plural documents to be processed in the page print mode.

Further, the image forming apparatus of the present embodiment is capable of execution of the "recording of page number with total number of pages" in the manual mode. In the manual mode, execution of the operation to automatically obtain the total number of document pages such as the document count operation using the ADF 101 or the like is disabled. The operator inputs the total page information, corresponding to the total number of documents (total number of document pages) as the subject of printing in the page print mode, via the user interface unit such as the operation unit 123 of the image forming apparatus. Then the total page information manually-inputted by the operator is print-outputted, with a page number, on a sheet where a document image is printed.

As described above, in the manual mode, the CPU circuit 122 obtains the total page information of documents to be processed in the page print mode, based on information inputted via the user interface unit such as the operation unit 123. Accordingly, the document count processing by the document-count unit (ADF 101, a document counter 305 or the like) of the image forming apparatus is not performed.

In the present embodiment, when the user selects the page print mode via the operation unit 123, the user can select desired one of the above two modes. Then, in accordance with the mode selected by the user, the CPU circuit 122 obtains the total page information of the job to be processed, and controls the printer and the like so as to print the total page information, with page number information of the document, on a sheet where the document image is printed.

This prevents the problems described in the conventional art, and provides the advantages as described above, and provides a flexible image forming apparatus and a system (including the image forming apparatus), in response to users' various needs (e.g., "user work such as document count is undesirable", "in case of miscount, the total number of document pages should be counted by the apparatus in the automatic mode", and "the manual mode is desirable since the documents might be damaged due to document jam").

Further, in the automatic mode, the CPU circuit 122 sequentially stores image data of documents to be processed into a predetermined memory such as the image memory 120, simultaneously with (in parallel with) the above-described series of operations to obtain the total number of pages by the ADF 101 or counter (total number of pages acquisition operation).

This unnecessitates the plural (twice) document transfer operation of repeating transfer of the same document by the ADF 101, upon execution of the "recording of page number with total number of pages" in the page print mode. That is, the above arrangement enables the page print mode to print an image based on image data of a job having plural pages, a current page number image as first additional information indicating the page number of the image data, and a total number of pages image as second additional information indicating the total number of pages of the job, on the same surface of one sheet, by one document transfer operation by the ADF. This unnecessitates plural transfers of bunch of documents by the ADF, and attains reduction of occurrence of document jam or the like. Further, even when the apparatus counts the number of documents in the automatic mode, the productivity can be improved by avoidance of repeated document transfer by the ADF even if the number of documents is large, while solving the above-described problems.

First, the operations of the respective units in the automatic mode will be described. A read-in controller 301 controls the reader 1 to read document images and stores them into the image memory 120 (sequentially stores the document images into the storage memories in FIG. 7). The document counter 305 counts the number of documents read by the read-in controller 301. For example, a document sensor is provided in the ADF 101, and upon passage of document set on the document tray of the ADF 101, information of the passage is notified to the document counter 301. The count value of the document counter 305 is incremented upon reading of one document, thus the number of documents is counted. When the read-in controller 301 detects the completion of reading of all the documents, a total page setting unit 306 sets the document count value at that time to the total number of pages. Note that the completion of reading of all the document can be detected from information from a document presence/absence sensor provided in the document tray of the ADF 101 to detect the presence/absence of document on the document tray (this detection operation is employed in the ADF reading mode). Further, in a case where the user directly supplies documents on the glass plate 102 (MDF reading mode), the completion of reading of all the documents is detected based on the user's instruction input. For example, the notification of completion of the reading by the user via a predetermined user interface unit (e.g., the operation unit 123 of the image forming apparatus) is determined by detecting information from the user interface unit. Note that in the present embodiment, in the ADF reading mode, as the number of documents set on the document tray of the ADF 101 is limited (e.g., to 100 sheets), the reading operation can be performed plural times. Accordingly, in such case, it may be arranged such that information indicating that no document exists can be notified from the user to the controller via the operation unit 123, and the controller determine the completion of reading based on the notification.

Figure 6K:
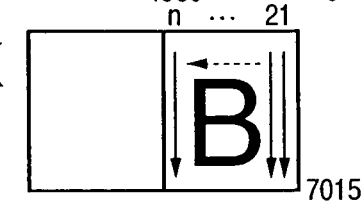
Figure 7:
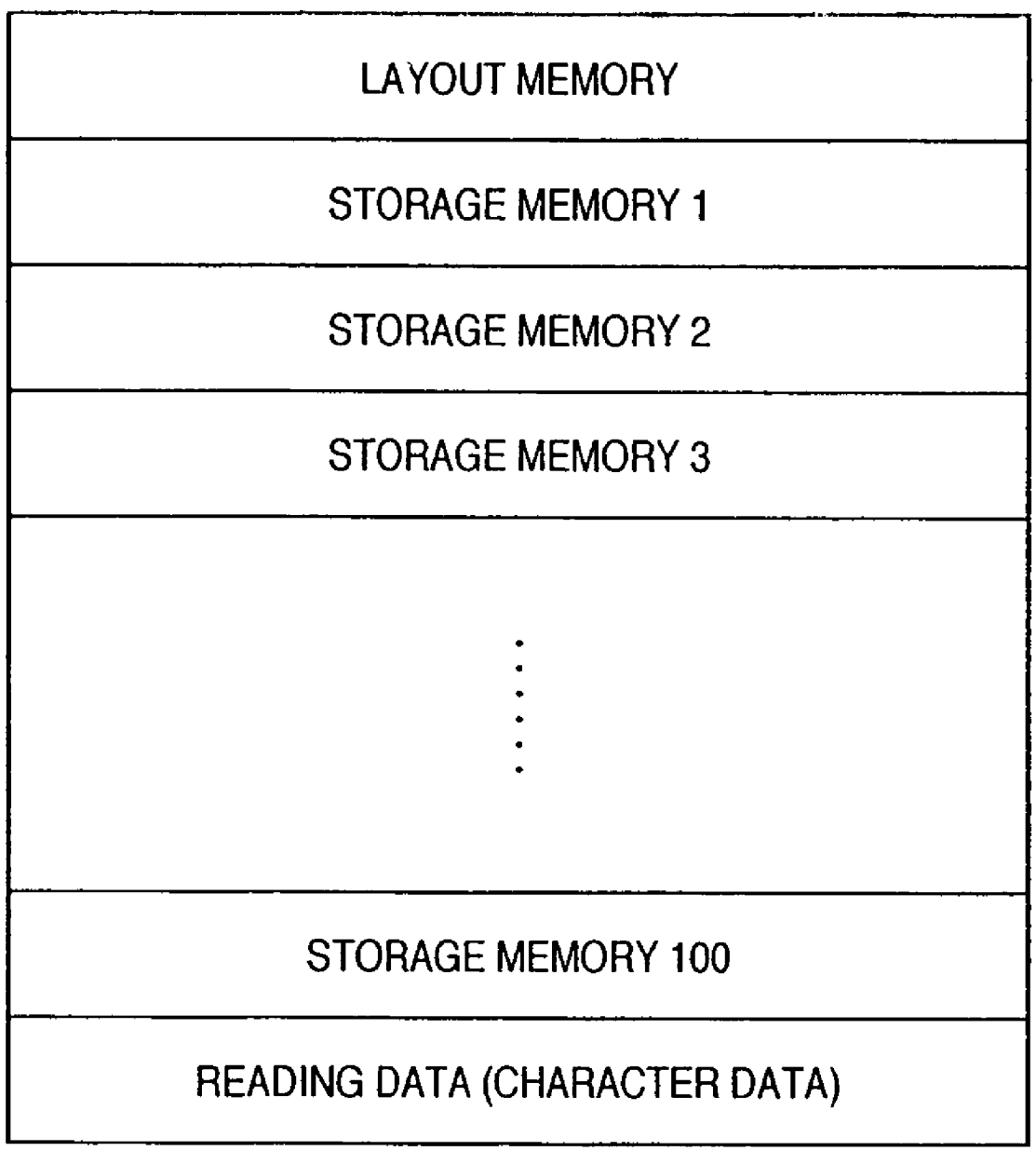
FIG. 7 is a table showing an example of data structure in the image memory.

When the document reading has been completed, a read-out controller 302 sequentially reads the images from the storage memories of the image memory 120, and draws them on a layout memory (FIG. 7). The image read-out control will be described later with reference to FIG. 6. A page description combining unit 303 determines page description using the total number of pages set by the total page setting unit 306 and a current page number supplied from a current page counter 307, and combines them on the layout memory. In the present embodiment, the position and the size of page description can be set as described later. An output controller 304 causes the printer 2 to perform image formation based on the document image with the page description drawn on the layout memory.

Next, an example where a document has 10 pages will be described. In response to the user's print-start instruction via the operation unit 123 (e.g., depression of the copy start key), the controller of the image forming apparatus causes the reader 1 to sequentially read the bunch (10 pages) of documents, set on the document tray of the ADF 101, from the first page. Further, the controller performs total page count processing to obtain the total number of pages of the job by incrementing the document counter or the like by 1, or the like, simultaneously with (in parallel with) the storage of the document image data for 1 page from the reader to the image memory 120. Accordingly, when all the document image data for 10 pages has been stored into the image memory 120, the controller recognizes (determines) that the total number of document pages is 10.

As described above, the image forming apparatus of the present embodiment is capable of first-page processing. Accordingly, the controller controls the image memory 120 and the printer 1 to perform print output of image data read from the image memory 120 from the first page, as in the case of the page order upon reading operation.

Accordingly, upon printing, the controller performs control as follows. First, the controller reads first-page document image data from in the image memory 120 holding the document images of all the pages, on the layout memory. Further, the controller obtains an image based on current page information "1" as the first additional information of the job corresponding to a page number, specifying the page number of the image of the job, and an image based on total page information "10" as the second addition information of the job corresponding to the previously-obtained total number of pages of the job. Then the controller combines the document image of the first page, the image based on the current page information "1", the image based on the total page information "10", as data corresponding to an output result on the first recording paper, on the layout memory. The controller reads the obtained combined image data from the layout memory, and print-outputs the data on the first recording paper (the first surface of the recording paper in the case of double-sided printing).

Thus, an output result, where the image corresponding to the first-page image data of the job having plural pages (a series of image data), the image indicating "1" corresponding to the page number of the image data (first additional image), and the image indicating "10" corresponding to the total number of pages of the job including the image data (second additional image), are printed on the same surface of one recording paper, is obtained.

Next, upon printing of the second page of the job, the controller reads document image data of the second page from the image memory 120 on the layout memory. Then the controller combines the document image of the second page, an image based on current page information "2" corresponding to the page number of the page, and the image based on the total page information "10", as an output result on the second recording paper, on the layout memory. The controller reads the combined image from the layout memory and print-outputs the data on the second recording paper (the second surface of the recording paper in the case of double-sided printing).

Thus, a second output result, where the image corresponding to the second-page image data of the job having plural pages (a series of image data), the image indicating "2" corresponding to the page number of the image data (first additional image), and the image indicating "10" corresponding to the total number of pages of the job including the image data (second additional image), are printed on the same surface of one recording paper, is obtained.

The controller controls the related units including the image memory 120, the layout memory, and the printer to repeat the above series of print processing, sequentially by page, until there is no print data (for 10 pages in this example).

Note that in the present embodiment, a document image, an image indicating a page number, and an image indicating the total number of pages of the job, are combined as an output image for one page on the memory, and the combined image is read from the layout memory as page-print processed image data, and print-outputted by the printer 2.

Next, an example where printing for plural copies is set (e.g., 2 copies are set as the number of copies of the above 10-page job) will be described. Upon generation of the output result of the first copy, the controller stores the page-print processed image data corresponding to the output result into, e.g., the image memory 120. That is, electronic data, corresponding to the output result where the document image, the page number image and the total page image are laid out on the same surface of one sheet, by the number of pages (10 pages in this example) of that job is stored into the image memory 120. The data storage can be realized by storing the page-print processed image into the image memory 120 by printing of one page. Then, when printing of the final page in the first copy of the job has been completed (the 10 page of the first copy has been printed), the controller starts the print operation for the second copy. At this time, printing is performed using the page-print processed image data (the page-print processed image data of the first page to the page-print processed image data of the tenth page) stored in the image memory 120 in the print operation for the first copy. That is, the page-print processed image is sequentially read from the image memory 120, from the first page side, and printing of the first page to the tenth page for the second copy is performed using the image data. Thus all the output result of the second copy can be obtained.

In this arrangement, in the page print mode to print total page information with page number, even when plural copies are designated by the user, the operation of the ADF corresponding to the number of copies is not necessary. Accordingly, print time by the completion of print-output of all the copies can be reduced, and the productivity can be improved. Further, as the ADF operation for one job is performed only once upon printing for the first copy, the occurrence of document jam can be reduced and the deterioration of document can be prevented.

Note that as the above control is performed in consideration of users' merits, it is not necessary an essential matter. For example, a so-called analog construction to directly print a document image, a page number image (the first additional image in the page mode) and a total page image (the second additional image) on recording paper upon actual printing, without electronically generating page-print processed image data as above, may be employed. In this manner, the present invention is applicable to any construction as long as it is an image forming apparatus capable of obtaining a print output result where a document image based on image data of a job having plural pages (series of image data), a current page number image as first additional information indicating the page number of the image data, and a total page image as second additional information indicating the total number of pages of the job, are laid out on the same surface of one sheet.

The current page counter 307 holds the value of current page based on the count of print pages outputted from the output controller 304. An output page counter 308 counts the number of print outputs by the output controller 304. For example, upon completion of printing for one sheet, the count value is incremented. A completion determination unit 309 determines the completion of one copy and the completion of entire printing, based on the number of documents held in the document counter 305 (total page information) and the number of outputs in the output page counter 308 (corresponding to the current page number). For example, in a case where N documents (the total number of pages is N) are printed for M copies, when the number of outputs has become an integral multiple of N, it is determined that printing by copy has been completed. At this time, the current page counter 307 is reset with an initial value. Further, when the number of outputs has become N×M, it is determined that the printing for the designated number of copies (entire printing) has been completed.

On the other hand, in the manual mode, the total page setting unit 306 sets a manually-set value as the total number of pages. The read-out controller 302 starts reading of document image data and printing without waiting for the completion of reading of all the documents by the read-in controller 301.

For example, the user may select the page print function and the manual mode out of the two modes of the image forming apparatus, via the operation unit 123. When the manual mode has been selected, the controller (CPU circuit 122) controls to cause the user to input information on the total number of pages of the job to be processed via the operation unit 123. By this control, the user inputs information on the total number of pages of the job to be processed, at appropriate timing (upon setting of the page print mode by the user via the operation unit 123 or the like) before input of print start instruction (in the copy mode, before depression of copy start key).

When the information on the total number of pages has been inputted via the operation unit 123, the controller recognizes the total page information of the job as the subject of processing at this time. Thus the total number of pages can be obtained without the information on the number of documents from the document counter of the apparatus. Hereinbelow, an example of the control in this construction will be described.

An example where the user has selected the page print mode and the manual mode via the operation unit 123 for a job having 30 pages (series of document image data) will be described. The operator performs input of total number of pages (inputs information indicating that the total number of pages of the job is 30 using e.g. the ten keys of the operation unit 123), from the operation unit 123. Then, after the completion of the input, the operator inputs a print start instruction (depression of copy start key) via the operation unit 123. The controller (CPU circuit 122) controls the ADF 101, the reader 1 (scanner), the image memory 120 and the printer 2 so as to perform the following operations in accordance with the input total number of pages and the print start instruction.

The bunch of documents of the job (30 pages) to be processed, set on the ADF 101, is transferred by the ADF 101 sequentially from the first page document. The scanner is controlled to perform a reading operation on the transferred documents and the document image data are stored in the image memory 120. Then, simultaneously with (in parallel with) the document reading operation and storage into the image memory 120, the print operation based on the image data read from the image memory 120 is performed by the printer.

Regarding the currently-processed job, the page print mode and the manual mode are set. Accordingly, the controller controls the printer to perform printing of the job when, e.g., image data for one page has been stored into the image memory 120, without waiting for the storage of all the pages (30 pages) of the job into the image memory 120.

For example, in accordance with storage of first-page image data of this job into the image memory 120, the current page counter 307 sends information indicating that the current page number is "1" to the controller. The controller recognizes the current page number information. On the other hand, the controller has already determined that the total number of page of the job is "30" through the operator's input of the total number of pages. The first-page document image data is read from the image memory 120 to the layout memory, and an image based on the first-page document image data, an image based on the current page information indicating the page number of the document, "1", and an image based on the total page information indicating the total number of pages of the job, "30", are combined on the layout memory. Then the combined image is read from the layout memory, and print-outputted by the printer. Thus, a print output result, the first-page image, the image of the page number "1" as the first additional information, and the image of the total number of pages "30" as the second additional information, are laid out on the same surface of the first-page recording paper, is obtained. The controller controls the image memory 120 and the printer so as to repeat the above series of page print operations upon each completion of storage of image data for 1 page in the image memory 120. In this example, as the printing for the first page (printing of the first-page document image, the current page number information image and the total page information image on the first recording paper) has been completed, the process proceeds to printing for the second page of the job. That is, in response to storage of document image data into the image memory 120, the controller obtains current page information of the page, "2", and performs processing similar to that for the first page using the current page number information and the already-obtained total page information "30". That is, the controller controls the image memory 120, the layout memory, the printer and the like, to output a printed result where an image based on the second-page document image data, an image of the page number "2" and an image of the total number of pages "30" are laid out on the same surface of the second-page recording paper. The controller repeats the series of operations until printing for the 30th page has been completed.

As described above, if the manual mode has been selected by the user via the operation unit 123, the controller controls the printer to start page print operation before image data of all the pages of the job to be subjected to the page print processing has been stored into the image memory 120. In this arrangement, output results can be obtained in shorter time than that required for obtaining all the output results in the case of the above-described automatic mode, and the productivity can be further improved.

Note that in a case where the user sets the number of copies to two or more (plural copies), the controller reads the page-print processed image data, generated upon output of the first copy, from the layout memory, and stores the data into the image memory 120 for all the job (in this example, 30 pages), as in the case of the automatic mode. Then, in the printing for the second copy, the page-print processed image data are read sequentially from the first page side from the image memory 120, and print-outputted by the printer. In this arrangement, the productivity in output of plural copies in the manual mode can be dramatically improved.

As described above, in the present embodiment, the manual mode and automatic mode are provided such that the user can select a desired mode. In this arrangement, if the user wants to obtain an output result immediately, the user may select the manual mode in consideration of productivity. On the other hand, if the user does not care about the productivity but is nervous about misprint or if the user thinks that counting of the total number of the document pages is troublesome, the user may select the automatic mode. In this manner, the present invention can meet users' various needs.

Note that in the manual mode, the controller (CPU circuit 122) disables the count operation to count the total number of pages for printing the second additional information (an image corresponding to the total number of pages of the job) on recording paper. That is, the controller disables the page count operation by the unit capable of counting the number of pages of job (e.g., the document counter 305). Since wasteful operation is not performed, the load on the apparatus can be reduced as much as possible.

Note that even in the manual mode, the controller (CPU circuit 122) enables the page count operation for other purpose than the printing of the second additional information on recording paper. That is, the operation of the unit to count the page number of the job (e.g., the current page counter 307) is enabled.

This unnecessitates the user's manual input of current page number information as the first additional information in the manual mode. For example, the total page information cannot be obtained until storage of all the pages into the image memory 120 has been completed (or until there is no document to be read on the document tray of the ADF 101) as in the case of the automatic mode, without the user's input operation. On the other hand, the current page number information can be sequentially obtained while the reading, storage processing and print processing are performed, without influence on the productivity.

In the manual mode, the count operation to count the number of document pages for printing the second additional information is disabled (the operations of the document counter 305 and the total page setting unit 306 are disabled). However, to print the first additional information (an image corresponding to the current page information indicating a page number) on recording paper, the operation to count the number of pages of the job is enabled. In this example, the controller (CPU circuit 122) disables the count operation by the document counter 305 while enables the count operation by the current page counter 307 and the output page counter 308.

Further, other document count operations for any other purposes may be enabled. For example, to improve the usability, a job progress state may be notified to the user via the user interface unit such as the display unit 250 of the operation unit 123. In this case, the CPU circuit 122 enables the operations of the document counter 305 and the current page counter 307 so as to indicate the number of print-completed pages of the job.

Further, to prevent wasteful output as much as possible, it is desirable that, in a case where printing is stopped due to occurrence of some print interruption cause and then the print interruption cause is removed, the print processing is restarted from the print-suspended page without reprinting the already printed pages. Accordingly, to realize such recovery processing, it may be arranged such that the operations of the counter units such as the document counter 305 and the current page counter 307 are enabled even in the manual mode so as to count print-completed pages of the job. Note that as a print interruption cause, document jam inside the printer, the shortage of recording paper from a paper feeding unit and the like may occur.

In the above arrangement, the units of the image forming apparatus can be fully utilized. Since the arrangement is made in consideration of users' merits, it is not necessarily an essential matter of the invention.

Further, to flexibly meet users' various needs in printing of additional information such as page number and total number of pages of job on recording paper as described above, the following control may be provided.

For example, in the present embodiment, basically, document image data, with a current page number image as the first additional image information and a total page image corresponding to the total number of pages of the job as the second additional information, are printed on recording paper. However, some user may print only the total page information as the second additional information image.

For example, in an office environment, a document generated by another person is frequently copied using an image forming apparatus. In such situation, in the original document, print-outputted from a PC or the like using a printer function, may be already page-numbered with a printer driver or the like. As the page numbers are already printed, a user who is to copy the document wants to print, as an additional image of the total number of pages of the document (e.g., 8 pages), only the second additional information image ("8" corresponding to the total number of pages of the job), with images of the document, on recording paper.

Accordingly, in the image forming apparatus of the present embodiment, an operation mode to print-output only the second additional information, with a document image, in the automatic mode and the manual mode, is provided. That is, there are a first control sequence to operate the units (at least one of the image memory 120, the layout memory and the printer 2) to print-output the first additional information (current page number) and the second additional information (job total page information) with a job document image on recording paper, and a second control sequence to disable printing of the first additional information on recording paper but operate the units to print the second additional information with a job document image on recording paper. The first or second control sequence may be selected in any of the automatic mode and the manual mode in the page print function.

The user can select a desired one of these two control sequences via the operation unit 123. The controller (CPU circuit 122) controls the image forming apparatus to execute the selected sequence.

In this arrangement, the advantage that users' various needs can be flexibly met can be further improved.

Note that the image forming apparatus may further have a third control sequence to print-output only the first additional information (current page number) with a document image on recording paper. That is, in the third control sequence, the units (at least one of the image memory 120, the layout memory and the printer 2) of the apparatus are operated so as to enable printing of the first additional information but disable printing of the second additional information. The third control sequence may be selected in any of the automatic mode and the manual mode in the page print function.

When a desired one of these three control sequence has been selected by the user via the operation unit 123, the controller (CPU circuit 122) controls the image forming apparatus to execute the selected sequence. This further improves the above advantage.

Note that since this arrangement is also made in consideration of user merits, it is not necessarily an essential matter of the invention. That is, the present embodiment is also applicable to an image forming apparatus capable of performing only the first control sequence, and/or an image forming apparatus capable of performing only the second control sequence, and/or an image forming apparatus capable of performing only the first and second control sequences.

In this manner, the present embodiment is applicable to any type of image forming apparatus as long as it is capable of printing at least the second additional information corresponding to the total page information of job, with a document image of the job, on recording paper, and the above advantage can be attained.

Further, in the present embodiment, in the automatic mode and the manual mode, the series of processing steps including storage processing, as follows, differs in respective modes. For example, if the manual mode has been selected, the controller (CPU circuit 122) starts the print operation before storage of image data of all the pages of a job to be processed by the page print function into the image memory 120 has been completed. For example, when image data for one page has been stored into the image memory 120, the controller causes the printer 2 to start the print operation to lay out the document image and additional information (at least one of current number information as the first additional information and total page information of the job as the second additional information) on the same surface of one sheet of recording paper. Then performs print processing sequentially from the first page side, by each storage of image data for one page into the image memory 120. Note that while the print operation is performed, the reading operation for the subsequent page, the current page count operation and the storage into the image memory 120 are performed in a parallel manner. Thus, the productivity in the image forming apparatus using the page print function can be improved.

On the other hand, if the automatic mode has been selected, start of print processing is disabled before storage of image data of all the pages of the job to be processed in the page print function has been completed (at least in a state where the total page information of the job is unknown). When the storage of image data of all the pages of the job into the image memory 120 has been completed, printing is started. Note that the start of printing may be performed even before completion of storage of the data of all the pages of the job into the image memory 120 if the total page information has been obtained by the document counter 305 and the total page setting unit 306 and the like. Note that the print operation in the manual or automatic mode is to lay out a job document image, and job additional information (at least one of current page number information as first additional information and total number of page information of the job as the second additional information), on the same surface of one sheet of recording paper. Note that while the print operation is performed in the automatic mode, there is no image of the subsequent page of the job, the reading operation, the current page count operation and the storage into the image memory 120 are not performed for the subsequent page. However, when other new job than the current job has been inputted, to enable simultaneous reception of plural jobs to improve the productivity, the print processing for the current job subjected to the print processing by the page print function and the storage of the newly input job into the image memory 120 are performed in parallel (simultaneously).

As described above, in the image forming apparatus using the page print function, by utilizing the automatic mode, the load on the user can be reduced, and misprint of printing an erroneous total number of pages or the like can be prevented.

Note that it may be arranged such that the control differs in the automatic mode and the manual mode.

For example, in the manual mode, the page description combining unit 303 performs page description processing similar to that in the automatic mode. However, in addition to this processing, the page description combining unit 303 compares the total number of pages of job to be processed by the page print function with the current page number, and performs predetermined processing if "total number of pages<current page number" holds.

For example, in the manual mode, in a case where the job processed by the page print function has 30 pages, it is determined whether or not the page number value of currently-processed page is greater than the numeral value "30" obtained by the user's input (in other words, whether or not the current page number is "31" or greater). As a result of the comparison processing, if the current page number is less than the total number of pages (current page number<total number of pages), and if the current page number is equal to the total number of pages (current page number=total number of pages), the controller (CPU circuit 122) enables printing of the additional information (at least one of the first additional information and the second additional information) with a document image of the job on recording paper. On the other hand, if the current page number is greater than the total number of pages (current page number>total number of pages), the controller (CPU circuit 122) disables printing of the additional information (at least one of the first additional information and the second additional information) with a document image of the job on recording paper.

Note that in this case, it may be arranged such that when printing of the additional information is disabled, (1) a first disable mode to disable printing of current page information as the first additional information and disable printing of total page information ("30" in this example) as the second additional information, (2) a second disable mode to enable printing of current page information as the first additional information but disable printing of total page information ("30" in this example) as the second additional information, and (3) a third disable mode to disable printing of current page information as the first additional information but enable printing of total page information ("30" in this example) as the second additional information, are provided. The user can perform a desired one of the disable modes.

Note that in these three disable modes, printing of the first additional information and/or the second additional information on recording paper is disabled, however, recording processing of document image of the job is continuously enabled.

Further, a fourth disable mode to, if the above condition (current page number>total number of pages in the manual mode) is satisfied, not only disable printing of the additional information, but also disable printing of document image on recording paper, may be provided. (In this disable mode, a blank sheet is outputted.) These disable modes including the fourth disable mode may be provided such that the user can select a desired disable mode.

In the above arrangement, the above advantage in the page print function can be further improved. Further, even in the manual mode, the user's erroneous operation can be prevented as much as possible, and an appropriate output result can be obtained.

Further, in the manual mode, even when current page number>total number of pages holds, the user may request continuation of printing of page numbers and total number of pages. Otherwise, in the manual mode, even if the total number of documents (total number of pages) of a job actually inputted into the apparatus via the input unit such as the scanning unit does not correspond with the total number of pages inputted by the user from the operation unit 123, the user may request printing of the total number of pages on recording paper.

Accordingly, to flexibly meet users' various needs, an arrangement may be made to respond to such rare requirements.

For example, a continuation enable mode may be provided to, in the manual mode, even if the current page number is greater than the total number of pages inputted by the user via the operation unit 123 (current page number>total number of pages), enable continue printing of the first additional information and/or the second additional information.

Further, it may be arranged such that at least one of these four disable modes and the continuation enable mode can be selectable by the user via the operation unit 123, previously (at initial setting, page print mode setting or the like, or at a stage prior to execution of page print processing), or when the current page number is greater than the total number of pages inputted by the user (current page number>total number of pages). Then the CPU circuit 122 controls the image forming apparatus to operate in the mode selected based on the user's designation.

In this arrangement, the advantage that users' various needs in the page print function can be flexibly met can be further improved.

Note that the above-described respective controls are provided in consideration of users' merits, they are not necessarily essential matters of the invention.

The outline of the "recording of page number with total number of pages" according to the present embodiment is as described above. The details of the processing will be described later with reference to the flowcharts of FIGS. 13A to 13C.

Next, methods for image storage by the read-in controller 301 and image reading by the read-out controller 302 will be described with reference to FIGS. 6A to 6L and FIG. 7. FIG. 6A shows a storage capacity ensured in the image memory 120 for one image. In the present embodiment, the storage capacity, corresponding to an A3 sized 600 dpi image, is vertical 7015 bits×lateral 9920 bits. As shown in FIG. 7, in the image memory 120, there are one layout memory and one hundred storage memories each of which stores the one image shown in FIG. 6A. Further, a storage area for character data is also ensured in the image memory 120.

FIGS. 6B and 6C show an example where a document image is stored into the image memory. The document placed as shown in FIG. 6B is sequentially read an arrow direction in FIG. 6B, and written into the memory as shown in FIG. 6C. That is, an address (0,0) is designated as a start position, and an X-direction counter and a Y-direction counter are set for up-counting. When the first line is read, the Y-direction counter is incremented from 0 to 7015, and the image data is sequentially written from the address (0,0) toward an address (0,7015). Next, when the second line is read, the X-direction counter is incremented, and the image data is sequentially written from an address (1,0) toward an address (1,7015). Then, when the third line is read, the X-direction counter is incremented, and the image data is sequentially written from an address (2,0) to an address (2,7015). In this manner, the reading and writing are repeated to an address (4960,7015).

Next, processing for reading the image data, written into the memory as shown in FIGS. 6B and 6C, will be described with reference to FIGS. 6D to 6G. First, the data stored as shown in FIG. 6C is read as shown in FIG. 6D. That is, an address (4960,0) is designated as the start position, and the X-direction counter is set for down-counting while the Y-direction counter is set for up-counting. In the first line, the image data is read while decrementing the X-direction counter toward the address (0,0). Then, the Y-direction counter is incremented, and the second line is read by reading the image data from an address (4960,1) toward an address (0,1). Thus an image as shown in FIG. 6E is read by the above reading.

FIGS. 6F and 6G show another example of reading. The data stored as shown in FIG. 6C is read as shown in FIG. 6F. That is, the address (0,0) is designated as the start position, and the X-direction counter and the Y-direction counter are set for up-counting. The first line is read by reading the image data while sequentially incrementing the Y-direction counter toward the address (0,7015). Then the X-direction counter is incremented, and the second line is read by reading from the address (1,0) toward the address (1,7015). The reading as shown in FIG. 6G is performed by the above reading. Accordingly, the A4-width document image as shown in FIG. 6B can be read without rotation of the image as shown in FIG. 6G.

Further, as shown in FIG. 6H, an address (4960,7015) is designated as the start position, and the X-direction counter is set for up-counting, while the Y-direction counter is set for down-counting. The first line is read by sequentially reading to the address (4960,0). Then, the X-direction counter is decremented, and the second line is read by sequentially reading from an address (4959,7015) to an address (4959,0). By this reading, a 180°-rotated image as shown in FIG. 6I is read.

Next, the layout memory in FIG. 7 will be described. As described above, respectively-stored images as shown in FIGS. 6J and 6K are read, then written into desired positions of the layout memory, and the respective document images can be combined on the memory as shown in FIG. 6L.

Figure 8:
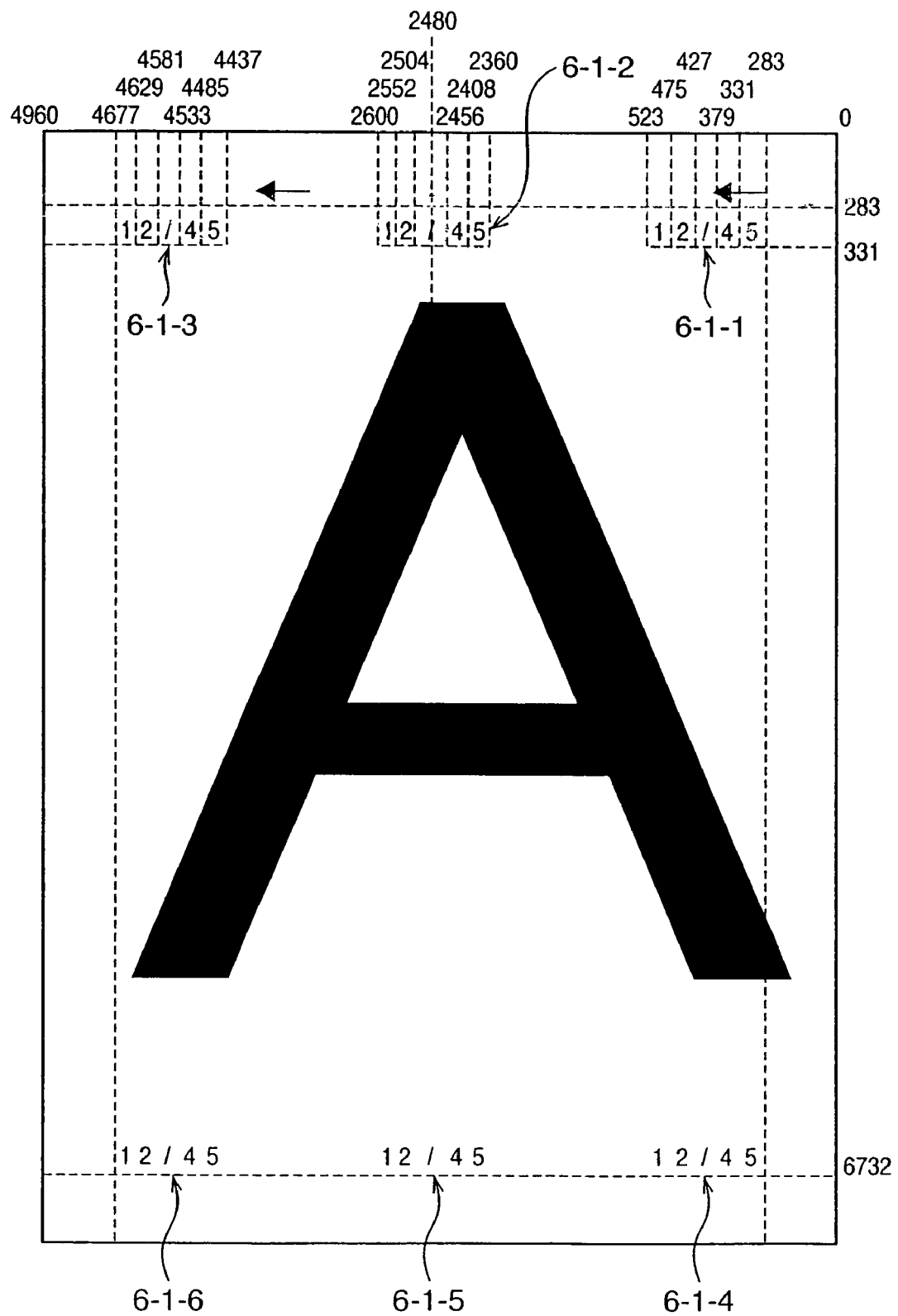
FIG. 8 is an explanatory view of recording of page number with total number of pages according to the embodiment.

Next, the method for reading image data from the character data ROM 130 based on a character code and mapping the data on the image memory will be described with reference to FIG. 8. The processing is performed by the page description combining unit 303.

As representation of "current page number/total number of pages", one of six positions, upper right (6-1-1), upper center (6-1-2), upper left (6-1-3), lower right (6-1-4), lower center (6-1-5) and lower left (6-1-6), is selected, and combined in a document image.

Next, an example where a 12-point sized page number "12/45" is combined in the upper right position (6-1-1) in a document image in FIG. 8 will be described. The upper light "12/45" is combined from an address (283,283) corresponding to 12 mm×12 mm toward an address (1123,283). Each character is formed as a 48×48 bitmap, and read from the storage memory to be described later. The character "5" is combined from an address (283, 283); the character "4", from an address (331,283); the symbol "/", from an address (379, 283); the character "2", from an address (427,283), and the character "1", from an address (475,283).

Next, the combining of the character "5" from the address (283,283) will be described. Assuming that the head address of the character data "5" is a, data is read for 6 bytes from the head address of the character data to be described later from the address (283,283) to an address (331,283), and written into the layout memory. Next, the second line of the character "5" is combined. That is, the data is read for 6 bytes from a+24 address from an address (283,284) toward an address (331, 284), and written into the layout memory.

The above operation is performed from the address (283, 283) to an address (331,331), thereby the character data "5" is written on the memory. At this time, the data writing may be made by overwriting or OR writing. The overwriting enables clear printing of page number. Further, in the case of watermark function of overwriting a serial number or the like in the background, the OR writing enables the watermark function. The combining and writing operations are similarly performed on the characters "1", "2", "/" and "4".

The upper left page number "12/45" (6-1-3) is combined from an address (4629,283) toward an address (4677,283) such that the character "1" is combined at an address (4677, 283). The character "5" is combined at an address (4437,283); the character "4", at an address (4485,283); the character "3", at an address (4533,283); "2", at an address (4581,283); and "1", at an address (4629,283).

The upper center page number "12/45" (6-1-2) is combined at the center, 4960×7015. The page number "12/45" is combined from an address (2360,3413) such that the center of the characters "12/45" comes to an address (2780,283). Regarding the lower right page number "12/45" (6-1-4), the lower center page number "12/45" (6-1-5), and the lower left page number "12/45" (6-1-6), similar calculation and combining are performed.

Next, the method for calculating the head address of each bitmap data will be described. Assuming that the head address of the ROM 130 is 8000000H, the character bitmap data are stored in the ROM 130 as shown in FIG. 9. That is, 8 point (e.g. 0.8 mm-square size character)/9 point (e.g. 0.9 mm-square size character)/10 point (e.g. 1 mm-square size character)/10.5 point (e.g. 1.5 mm-square size character)/12 point (e.g. 2 mm-square size character)/16 point (e.g. 2.5 mm-square size character)/24 point (e.g. 4 mm-square size character)/32 point (e.g. 8 mm-square size character) numeric character data, and symbols "/" for the respective points are stored in the ROM 130.

The data amount of one 8-point data is 3 bytes (18 dots)×18 lines=54 bytes. The data amount of ten numeric character data is 540 bytes. The data amount for 8/9 point (3 bytes×21)/10 point (3 bytes×21) is 1860 bytes. Similarly, for 10.5 point, the data amount is 4 bytes×35 lines=1400 bytes; for 12 point, the data amount is 6 bytes×48 lines=2880 bytes; for 16 point, the data amount is 8 bytes×60 lines=4800 bytes; for 24 point, the data amount is 12 bytes×94 lines=11280 bytes; and for 36 point, the data amount is 24 bytes×188 lines=45120 bytes. The 8-point symbol "/" is stored at address 800000(H)+1070C(H) (67340 bytes)=801070C(H). Similarly, the 32-point symbol "/" is stored at an address 801070C(H)+8AE=8010FBA(H). The image of the symbol "/" is combined by reading data for 24 bytes×188 lines from the address 8010FBA(H) and OR writing the data at a predetermined address.

Next, returning to FIG. 1, the construction and operation of the printer 2 will be described.

An image signal inputted into the printer 2 is converted by an exposure controller 201 to a modulated light signal and emitted on an electrostatic drum 211. A latent image formed on the electrostatic drum 211 with the light is developed by a developer 212. A transfer sheet is conveyed from one of transfer paper cassettes 214, 215, 225 and 226 at timing corresponding to the front end of the developed image, and the developed image is transferred by a transfer unit 216 onto the transfer sheet. The transferred image is fixed by a fixing unit 217 to the transfer sheet, then discharged by a paper discharge unit 218 to the outside of the apparatus. The transfer sheet outputted from the paper discharge unit 218 is conveyed through a Z-fold unit 260. At this time, if a Z-fold function is effective, the transfer sheet is Z-folded by the Z-fold unit 260, and is conveyed through a punch unit 250. At this time, if a punch function is effective, the transfer sheet is punched, and is forwarded to a sorter 230. If a sort function is effective, the transfer sheet is discharged in one of plural bins of the sorter, while if the sort function is not effective, the transfer sheet is discharged to an uppermost bin of the sorter. If a staple sort function is effective, one of plural staple units in the sort bins is selected and the transfer sheets are stapled. The staple position is changed by selecting one of the staple units, however, the change of staple position may be realized by moving one staple unit.

The transfer sheet Z-folded by the Z-fold unit 260 is transferred to the punch unit 250. Note that the Z-fold processing is applied to only large-sized recording paper. In the case of small-sized recording paper, the direction change member does not operate, and the recording paper is conveyed to the punch unit 250.

Next, the method for outputting sequentially-read images to both surfaces of one output sheet will be described. The output sheet fixed by the fixing unit 217 is conveyed to the paper discharge unit 218 once, then the conveyance direction is inverted, then the sheet is conveyed to a paper re-feed tray 221 via a conveyance direction change unit 220. When the next document has been prepared, the document image is read in the process as described above, however, as the transfer sheet is fed from the paper re-feed tray 221, the document image is outputted to the rear surface of the same output sheet.

Figure 14A:
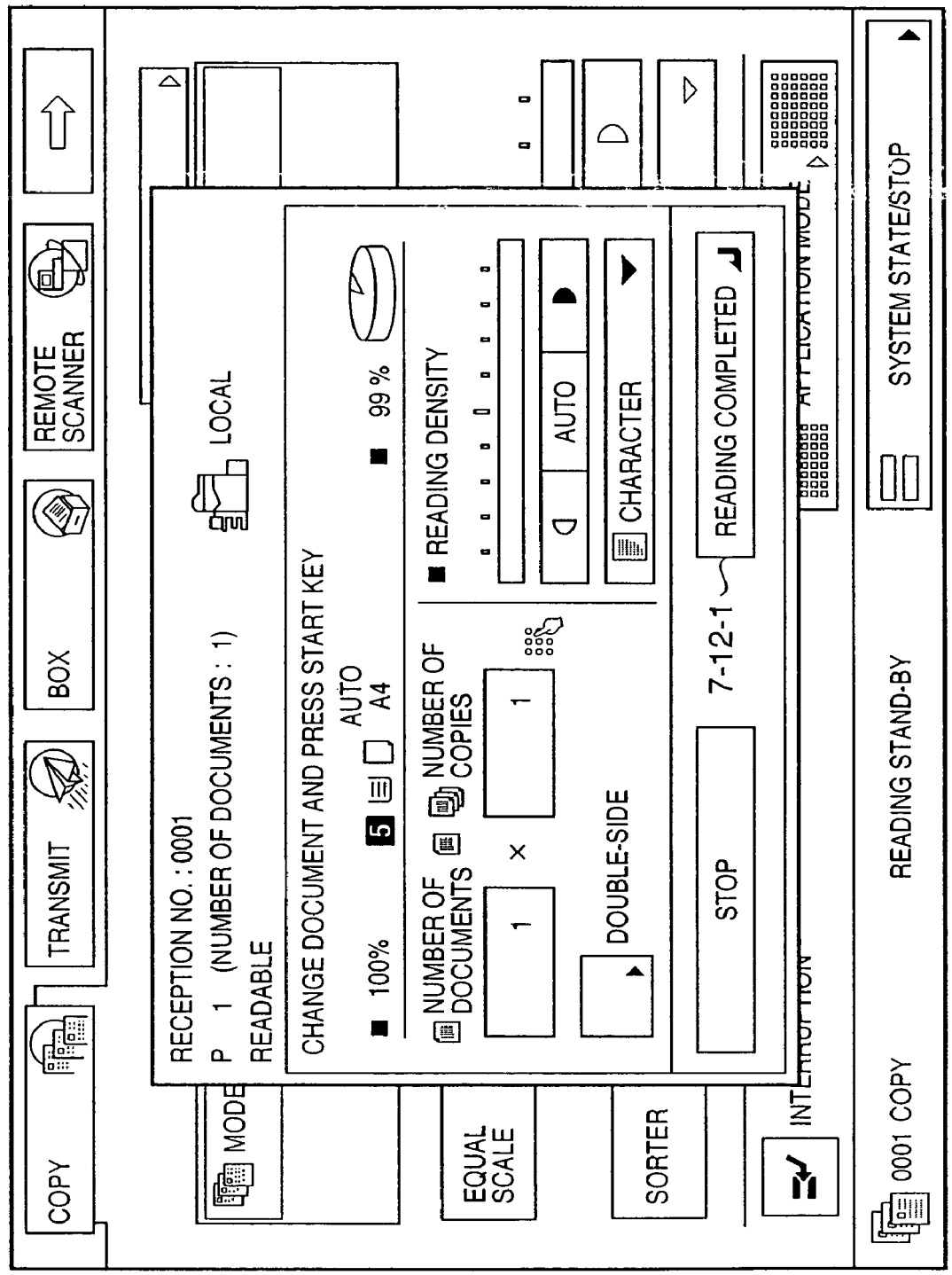
FIGS. 14A and 14B are examples of user interface for setting operation upon recording of page number with total number of pages according to the embodiment.
Figure 14B:
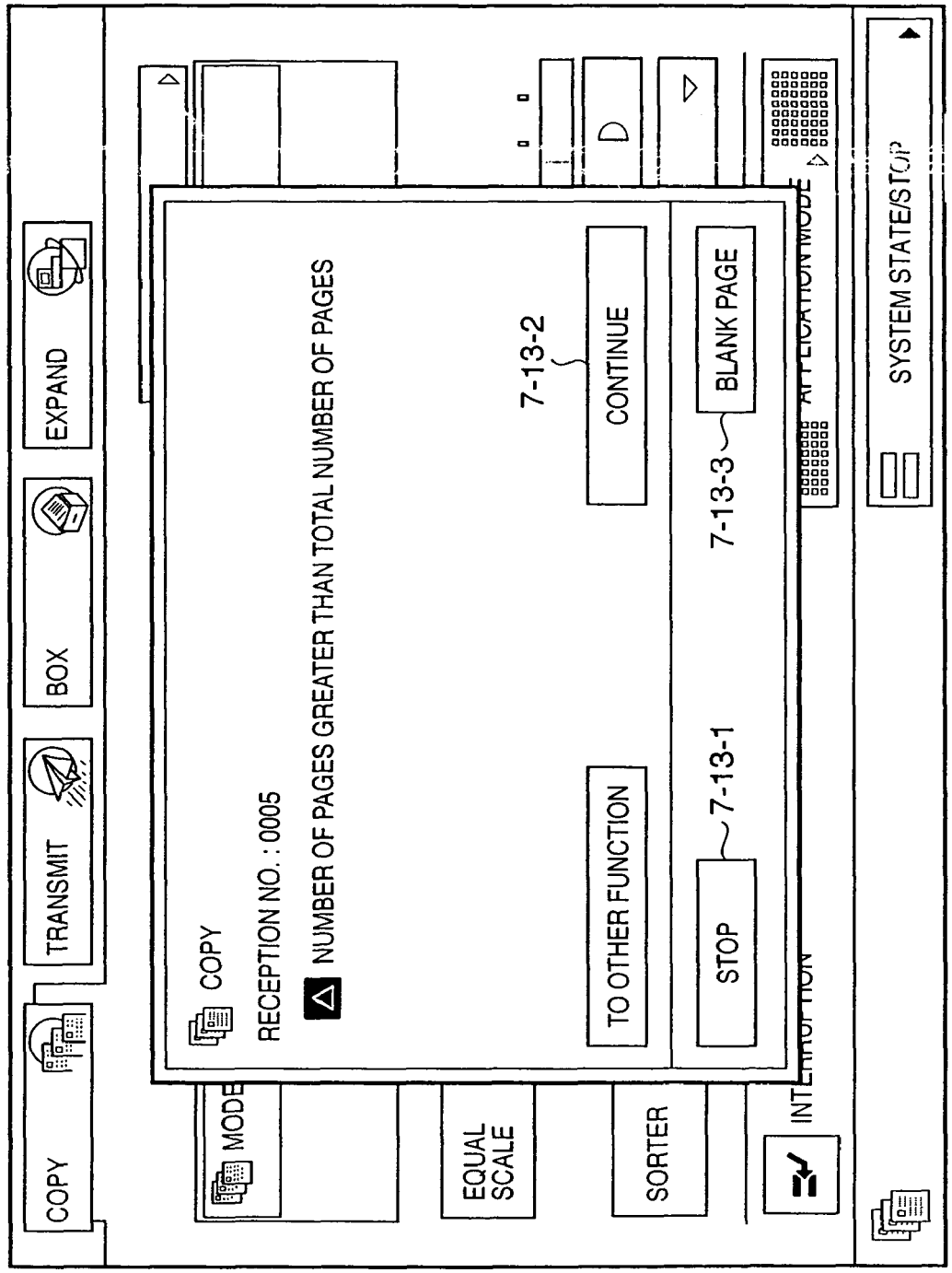

Next, the setting of the "recording of page number with total number of pages" function will be described with reference to FIGS. 10A to 10D, FIGS. 11A to 11D and FIGS. 12A to 12C. Note that controls to display various operation screens, including operation screens as shown in FIGS. 10A to 10D, FIGS. 11A to 11D and FIGS. 12A to 12C and operation screens as shown in FIGS. 14A and 14B, on the display unit 250 of the operation unit 123 is one of primary parts of the present embodiment, and these various operation controls related to the operation unit 123 are performed by the CPU circuit 122 as a control main body.

Figure 10A:
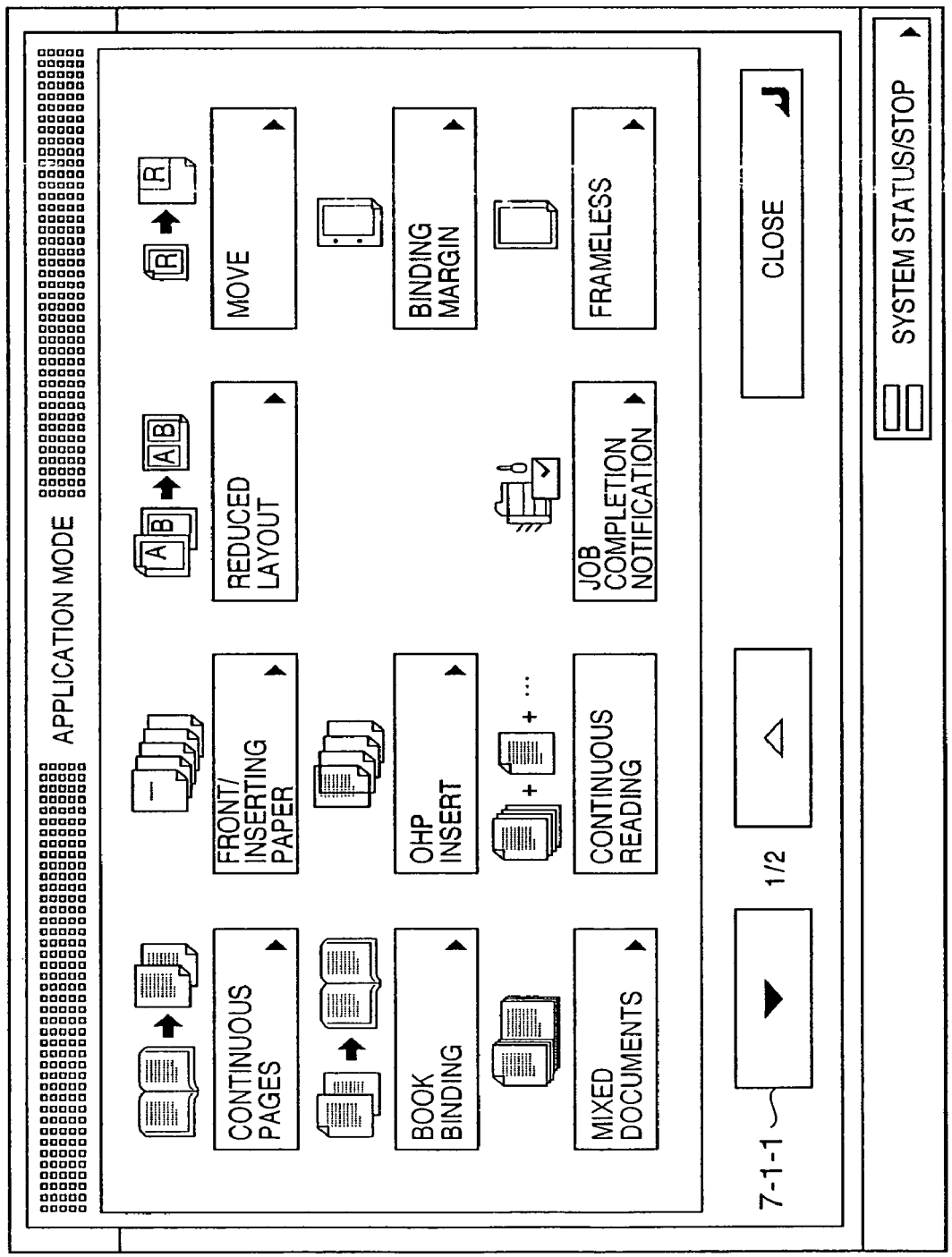
Figure 10C:
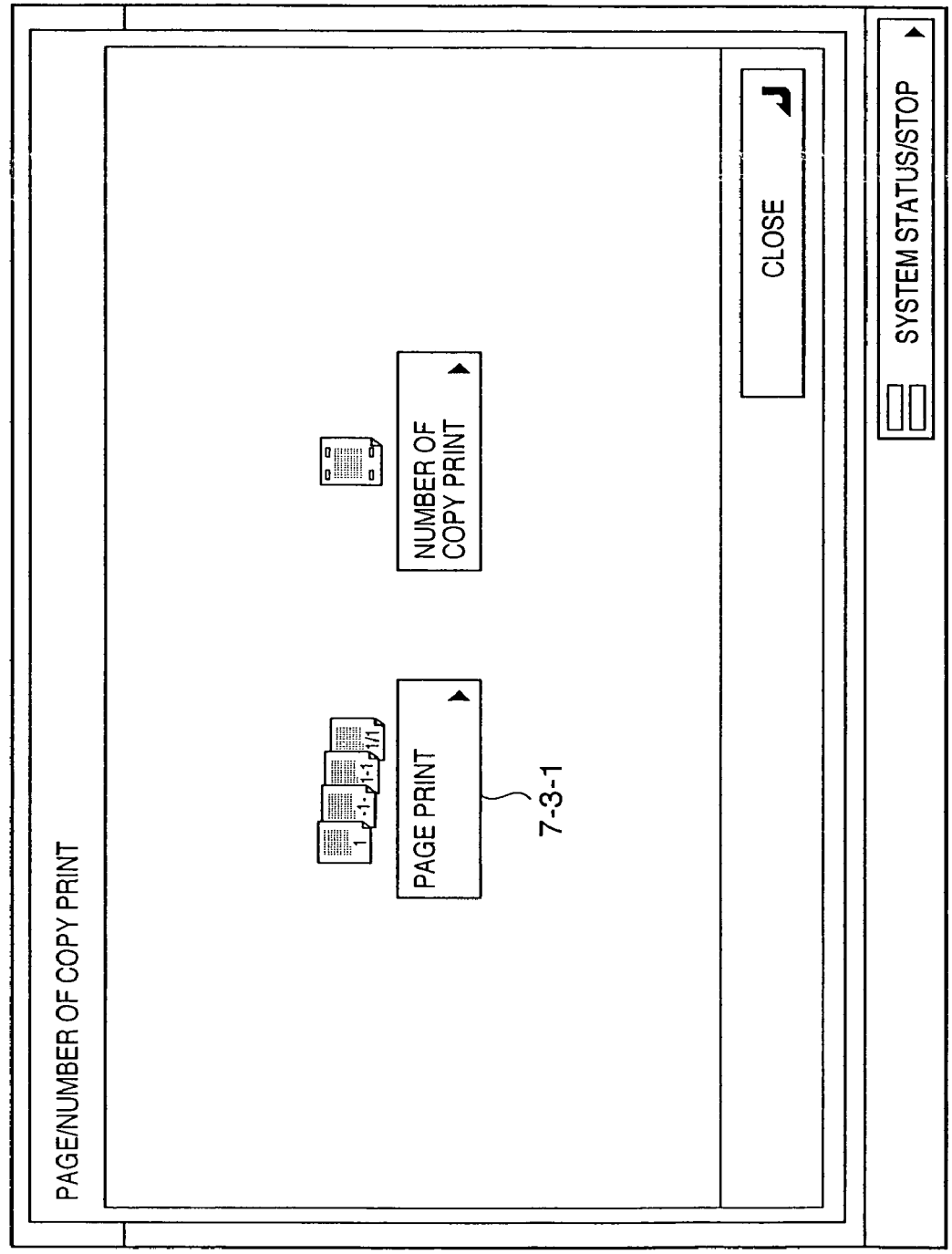

In a screen displayed on the display unit 250 of the operation unit 123 as shown in FIG. 4, when an application mode key 260 has been depressed by the user, the CPU circuit 122 displays an application mode menu screen as shown in FIG. 10A on the display unit 250. The user can select desired one of various application modes (e.g., a reduced layout function) via this screen and an application mode menu screen as shown in FIG. 10B. In the screen in FIG. 10A, if a "menu page feed" key 7-1-1 is depressed by the user, the CPU circuit 122 displays a setting screen corresponding to the second page of the application mode menu, having a display key for enabling the user's selection of the above-described page print function as shown in FIG. 10B, on the display unit 250. If the user depresses a "page/number of copy print setting" key 7-2-1, the CPU circuit 122 displays a page print/number of copies setting screen as shown in FIG. 10C on the display unit 250. If the user depresses a "page print selection" key 7-3-1 on the operation screen in FIG. 10C, the CPU circuit 122 displays a page print function selection screen as shown in FIG. 10D on the display unit 250.

Figure 10D:
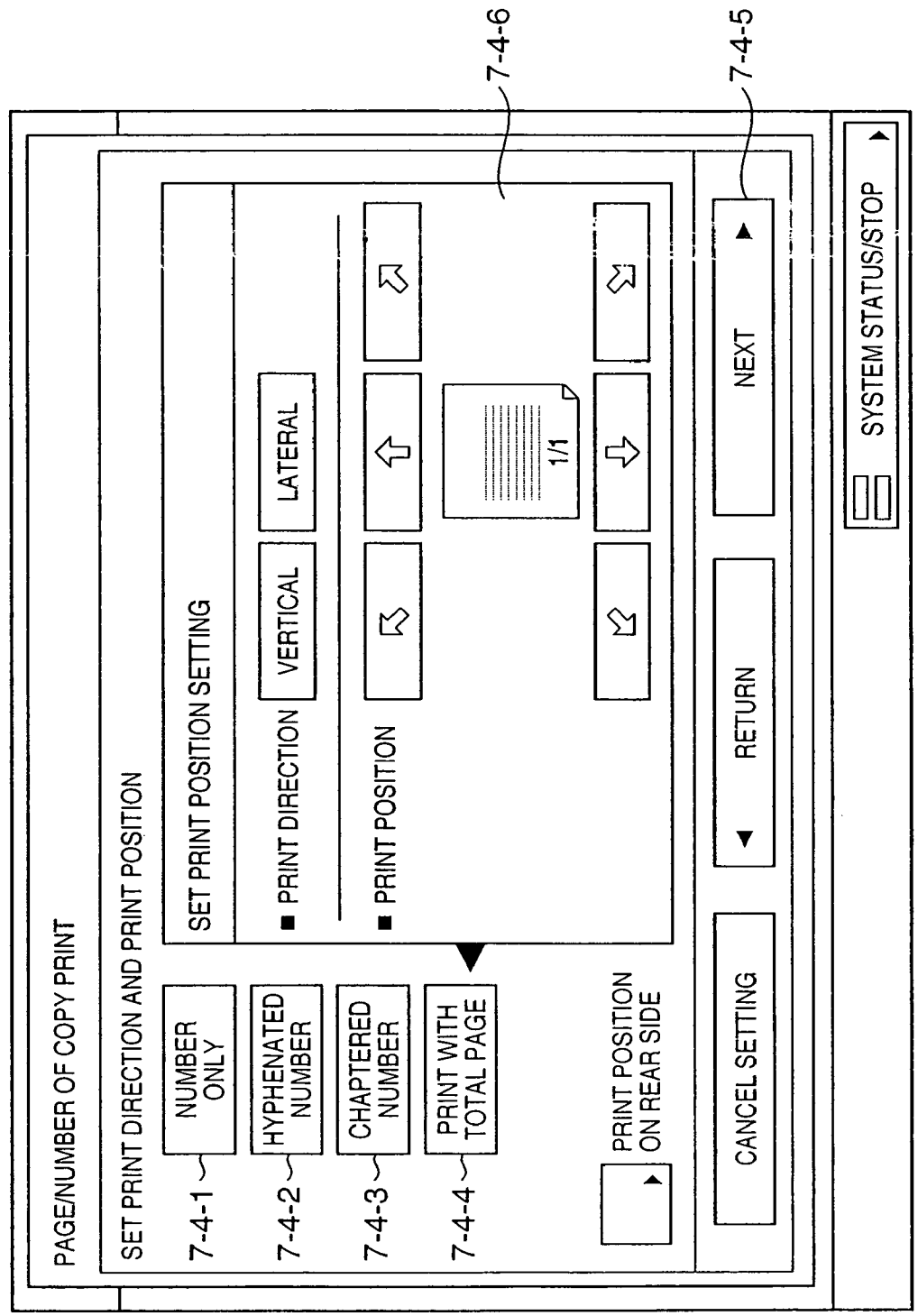

In the screen in FIG. 10D, an "only number" key 7-4-1 is a display key (soft key or touch panel key) used for user's selection of recording mode to print a page number as additional information with only numeric character image, with a document image, on recording paper. For example, if this mode is selected by the user, the CPU circuit 122 controls the respective units (layout memory, printer and the like) to print numeric character information, "1", "2", "3" or the like, corresponding to each page number, as additional information, on recording paper where a document image is printed.

Further, a "hyphenated number" key 7-4-2 is a display key used for user's selection of recording mode to print a page number as additional information with a hyphenated numeric character image, with a document image, on recording paper. For example, if this mode is selected by the user, the CPU circuit 122 controls the respective units (layout memory, printer and the like) to print a hyphenated page number, "–1-", "–2-", "–3-" or the like, corresponding to each page, as additional information, on recording paper where a document image is printed.

Further, a "chaptered number" key 7-4-3 is a display key used for user's selection of recording mode to print a page number as additional information with a chaptered numeric character image, with a document image, on recording paper. In this mode, for example, upon printing of a series of documents having plural chapters, additional information is print-outputted to clearly indicate the chapter and the page number of a current page. For example, if this mode is selected by the user, the CPU circuit 122 controls the respective units (layout memory, printer and the like) to print a chaptered page number, in the first chapter, "1-1", "1-2", "1-3" . . . "1-N" (the last page of the first chapter), in the second chapter, "2-1", "2-2", "2-3" . . . "2-N" (the last page of the second chapter), in the final chapter (e.g., M), "M-1", "M-2" . . . "M-N" (the last page of the final chapter), as additional information, on recording paper where a document image is printed.

Further, a "print with total page" key 7-4-4 is a display key used for user's selection or recording mode to print a page number as additional information with a numeric character image with the total number of pages, with a document image, on recording paper. For example, if this mode is selected by the user, the CPU circuit 122 controls the respective units (layout memory, printer and the like) to print a page number with the total number of pages, "1/5", "2/5", "3/5", "4/5", "5/5" or the like, corresponding to each page, as additional information, on recording paper where a document image is printed. In the present embodiment, the total page print mode includes the above-described manual mode and the automatic mode.

Further, the screen shown in FIG. 10D has a window 7-4-6 for user's designation of print position of the above-described page number data as additional information on recording paper. The user designates the direction of recording paper (vertical, lateral) by operating one of "vertical" and "lateral" print direction buttons in an upper part of the window 7-4-6. Further, the image forming apparatus of the present embodiment has six print position candidates (upper left, upper center, upper right, lower right, lower center, and lower left) as print positions for page information, and allows the user to designate one of these positions. The user operates one of six print position keys at the center of the window 7-4-6, thereby selects a desired candidate from the six print position candidates, lower left, lower center, lower right, upper left, upper center, and upper right on recording paper. The details of print operation corresponding to the respective print positions are as described above in FIG. 8.

Figure 11C:
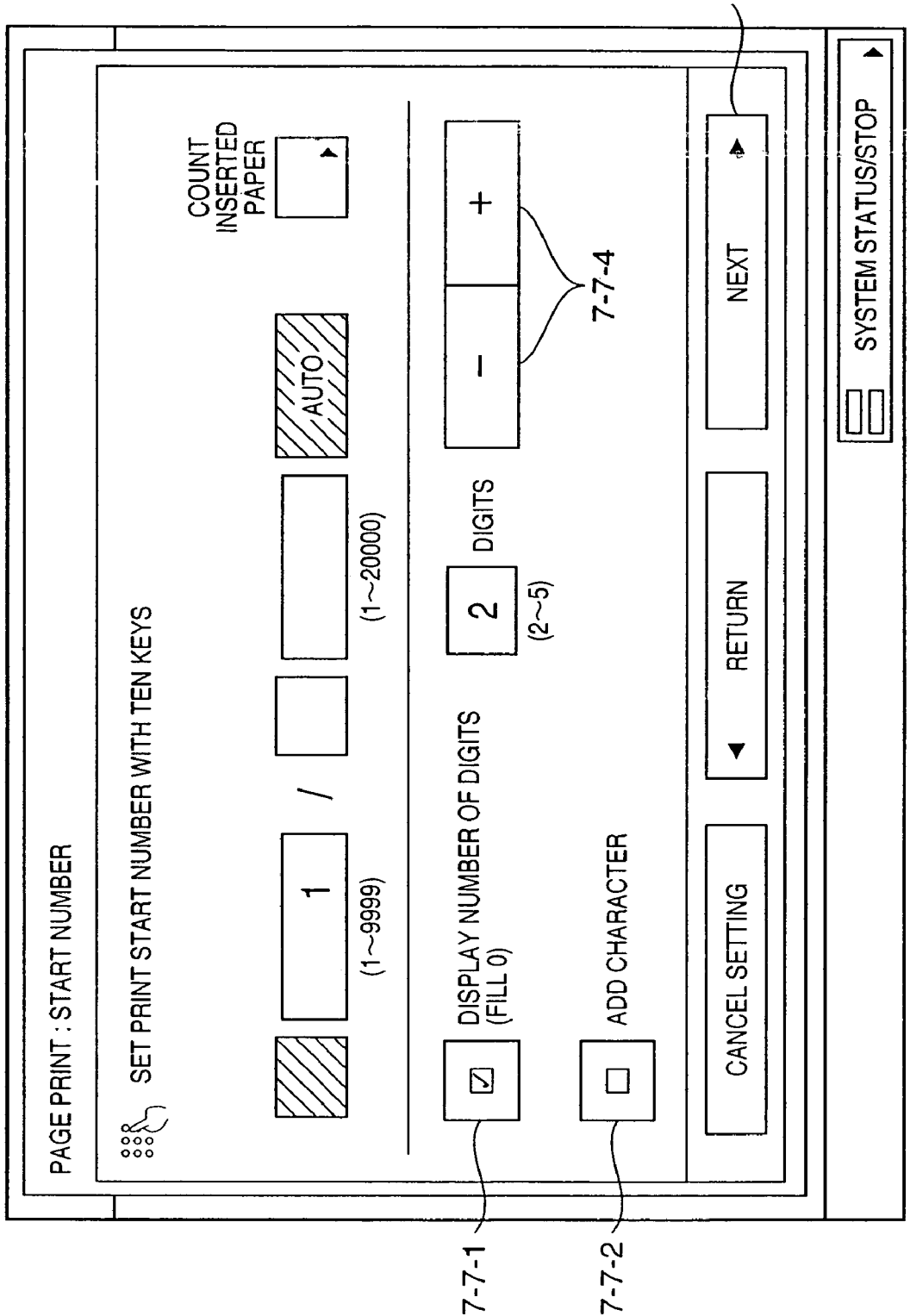

When the "print with total page" key 7-4-4 on the operation screen in FIG. 10D has been depressed by the user, the CPU circuit 122 displays a details setting screen for recording of page number with total number of pages, as shown in FIGS. 11A to 11C, on the display unit 250. Note that FIGS. 11A to 11C illustrate the same screen, however, show the screen as three examples for explanations of respective parts.

In the operation screen shown in FIG. 11A, a key 7-5-2 is a display toggle key (soft key) used for user's selection of automatic mode or manual mode to be executed by the image forming apparatus. When this key has been depressed by the user, the automatic mode becomes ON, and the key display state becomes an ON state (selected state) as shown in FIG. 11A. Further, when this key has been depressed by the user again, the automatic mode is turned OFF then the manual mode is turned ON. Then the key display state becomes an OFF state (non-selected state) as shown in FIG. 11B. In this manner, the CPU circuit 122 selectively perform the automatic mode and the manual mode based on the ON/OFF operation of the keys on the screen from the user.

The operation screen in FIG. 11A is displayed on the display unit 250 when the automatic mode has been selected. Further, when the user has depressed a key 7-5-1, a start number of current page number can be set by the user via the ten keys (245 in FIG. 4). The current page-number start number set by the user is displayed on a display area provided beside the key.

When a page number is sequentially printed on recording paper, where image data of processed job is print-outputted, by page, the current page-number start number setting function is used for the user's determination of page number to be first printed and sequentially printing page numbers from the determined number.

For example, if the key 7-5-1 has been depressed and a number "1" has been inputted using the ten keys, the CPU circuit 122 sets the page number to be printed on the first recording paper for the first-page document image to "1" (starts the page number from "1"). Then, the CPU circuit 122 controls the units (the image memory 120, the layout memory, the printer and the like) of the apparatus to sequentially print the subsequent page numbers, "2", "3", "4" . . . .

Further, if the key 7-5-1 has been depressed and "11" has been inputted using the ten keys, the CPU circuit 122 sets the page number to be printed on the first recording paper for the first-page document image to "11" (starts the page number from "11"). Then, the CPU circuit 122 controls the units (the image memory 120, the layout memory, the printer and the like) of the apparatus to sequentially print the subsequent page numbers, "12", "13", "14". In this manner, upon sequential printing of page numbers, the page number to be first printed can be set by the user.

The operation screen in FIG. 11B is displayed on the display unit 250 when the automatic mode is OFF, i.e., when the manual mode has been selected by the user. In this state (the manual mode has been selected via the user's operation of the key 7-5-2), the CPU circuit 122 controls the display unit 250 to turn a display key 7-6-1 for user's input of total page information to an operative state. That is, the CPU circuit 122 controls the image forming apparatus to, when the manual mode has been selected by the user, allow the user to input total page information for a job to be processed by the page print function.

On the other hand, when the automatic mode has been selected by the user via a key 7-5-2 (in the state as shown in FIG. 10A), no response is made to the user's depression of the display key 7-6-1. Otherwise, it may be arranged such that the display of the display key 7-6-1 is grayed out or dot-meshed so as to prevent the user from depressing the display key 7-6-1. In this manner, the CPU circuit 122 controls the image forming apparatus to, when the automatic mode has been selected by the user, disable the user's input of total page information of a job to be processed by the page print function. In addition to the above-described various advantages, user's erroneous operation can be prevented as much as possible, and the advantages can be further improved.

In FIG. 11B, the manual mode is selected by the user, and the CPU circuit 122 sets the display of the key 7-6-1 for the designation of total number of pages to an effective state (the key can be depressed by the user) on the display unit 250. When the key 7-6-1 has been depressed by the user, the CPU circuit 122 performs control such that the user can manually set the total number of pages using the ten keys (245 in FIG. 4). Note that the total page information inputted by the user is displayed in a display area on the right side of the key 7-6-1 for the user's checking. FIG. 11B shows an example where "10" is set as total page information in the setting of manual mode. Further, the start page number can be designated by depression of the key 7-5-1. The start page number can be set by using the key 7-5-1 as in the case of the automatic mode.

For example, if an enter key has been depressed on the print conditions in the screen shown in FIG. 11B and a print start instruction has been inputted by the user, the CPU circuit 122 controls the image forming apparatus to operate in accordance with the above-described processing procedure in the manual mode. Then, a bunch of outputs including 10 pages of output results where additional information, "1/10", "2/10", "3/10", "4/10", "5/10" . . . "10/10" are printed on the respective pages, can be obtained.

In this manner, in the present embodiment, various detailed controls are executable so as to attain the above-described various advantages.

Note that in a case where the automatic mode is selected by the user (i.e., in FIG. 11A), the apparatus is controlled to disable user's designation of total number of pages via the key 7-6-1.

Further, another example of control, when the automatic mode has been selected by the user via the key 7-5-2 as shown in FIG. 11B, a "warning/stop" switch 7-6-2 is displayed on the display unit 250. Otherwise, it may be arranged such that when the automatic mode is selected, the key 7-6-2 is displayed on the display unit 250 while a state where user's selection is disabled is displayed, and when the manual mode has been selected, a state where user's selection is enabled is displayed.

The warning/stop switch 7-6-2 is a display key for the user's previous setting to continue/discontinue processing when the number of documents has become greater than the total number of pages set by the user (a display key for the user's determination of execution/nonexecution of the above explained continuation permission mode). The details of the operation will be described at step S827 in FIG. 13A. This key is provided for response to users' needs when the manual mode has been selected by the user in the page print function and the user wants to print total page information different from actual total number of document pages. This arrangement further improves the advantage to meet user's various needs.

In FIG. 1C, a toggle key 7-7-1 for designation of digits of recording of page number with total number of pages is ON. When the key 7-7-1 is depressed, a neighboring plus/minus key 7-7-4 becomes depressible. When a plus key is depressed, the number of digits is changed as, e.g., 3→4→5. For example, if the number of digits is set to "5", the page printing of a page "1" of total 5 pages in the recording of page number with total number of pages is "00001/00005". When the number of digits is not set, page print is "1/5". A key 7-7-2 is used for setting for addition of character to a page number print. When the key 7-2-2 is depressed, a character input screen as shown in FIG. 11D is displayed.

Figure 11D:
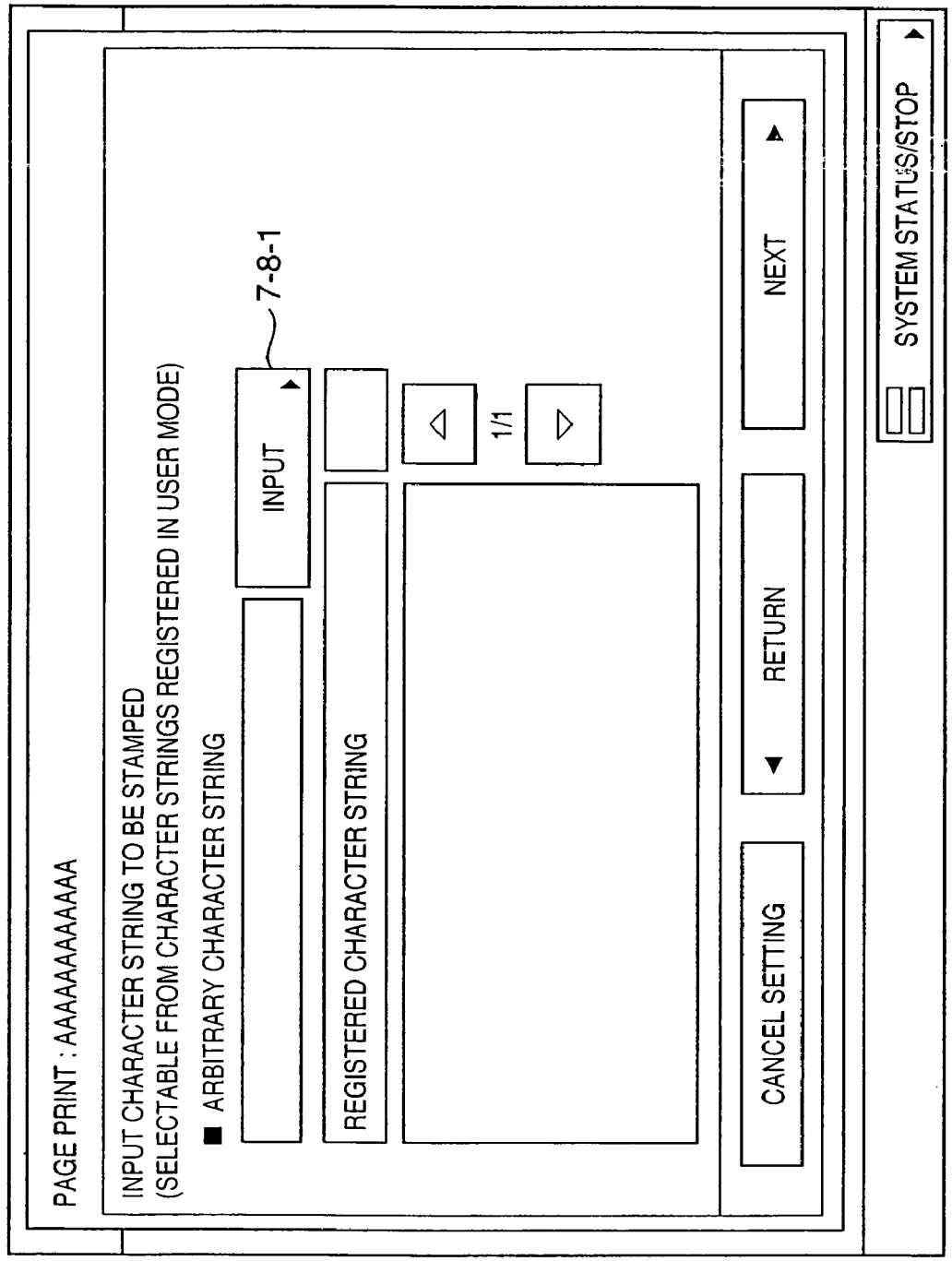
Figure 12A:
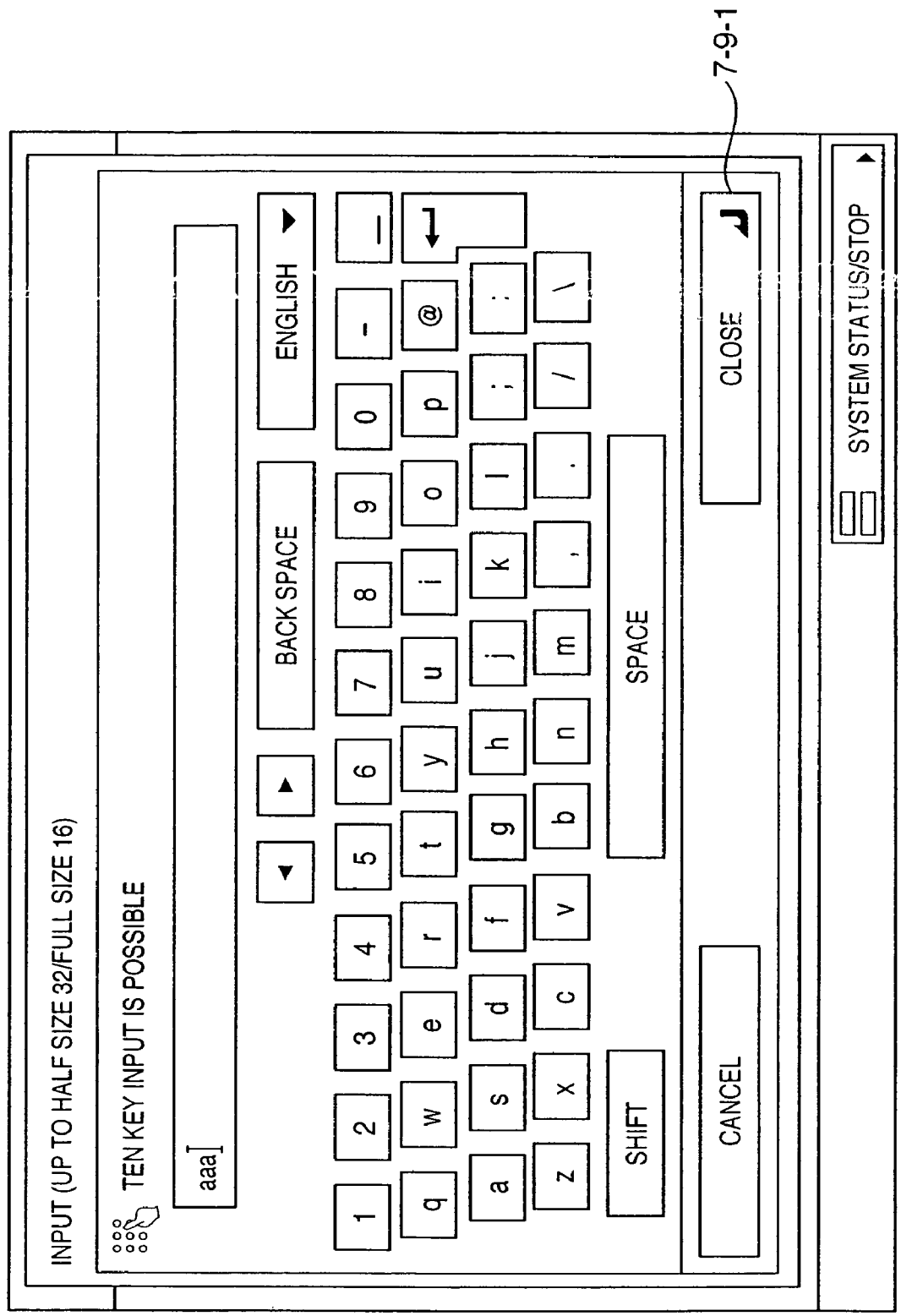

In FIG. 11D, a key 7-8-1 is used for selection of input of arbitrary characters or input of preset character string. When the key 7-8-1 is depressed, a screen as shown in FIG. 12A is displayed such that an arbitrary characters can be inputted from a keyboard in the display. For example, if characters "aaa" are set as print characters, page print for the first page of the five page document is "aaa 1/5". Further, the designation of number of digits and addition of characters can be simultaneously set to be effective. When an OK key 7-9-1 is depressed, a screen as shown in FIG. 12B is displayed, such that as a print size, large (16 point), middle (12 point) or small (10.5 point), and as a character color, black or white, can be selected. Note that in the screen as shown in FIG. 11A to 11C, when a "Next" key 7-7-3 is depressed, the screen in FIG. 12B is also displayed. When an "OK" key 7-10-1 is depressed, the setting of the recording of page number with total number of pages is completed, and a screen as shown in FIG. 12C is displayed. Note that character images such as alphabets are stored in the character data ROM 130.

Figure 13A:
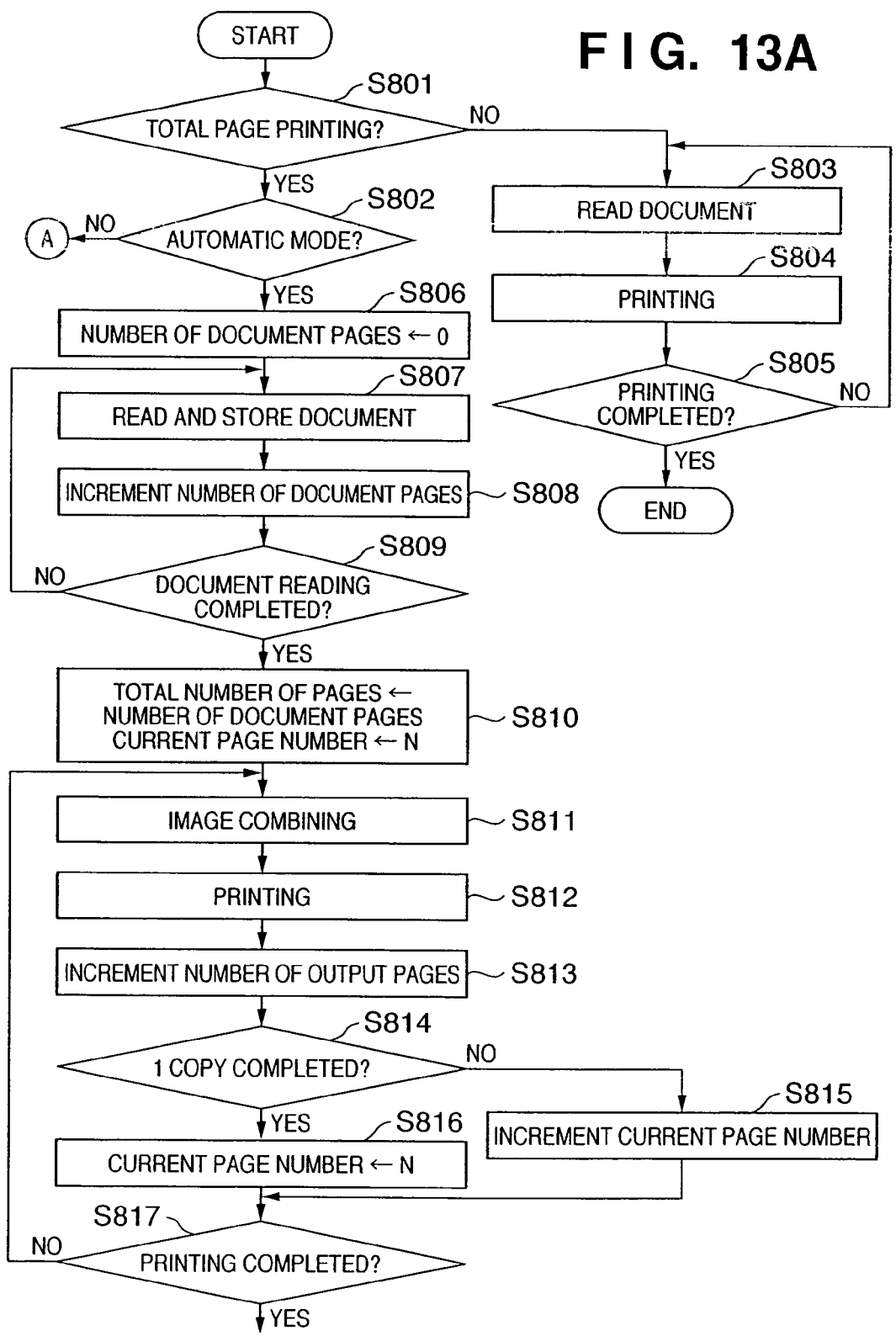
FIGS. 13A to 13C are flowcharts showing the operation of the copier according to the embodiment.
Figure 13B:
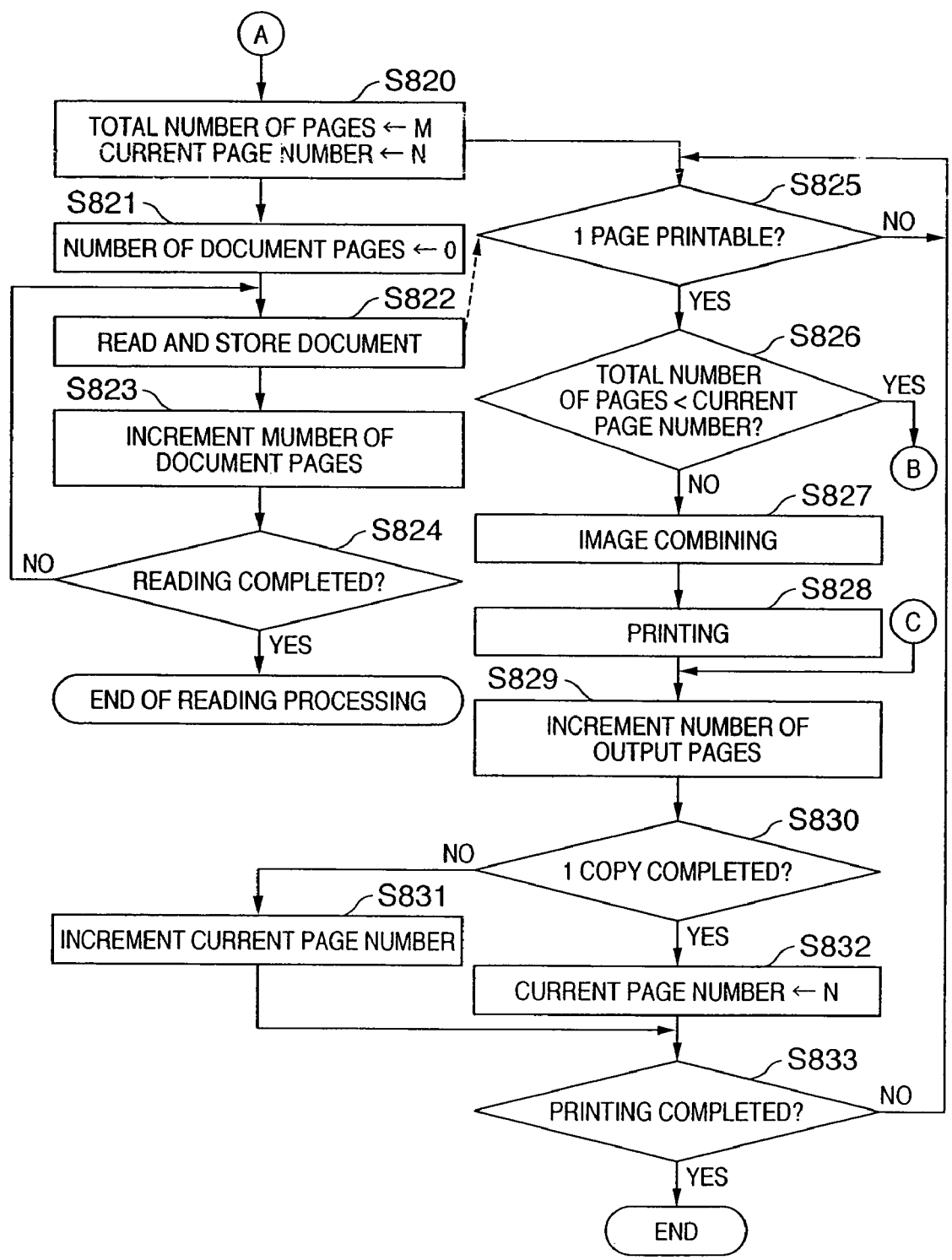
Figure 13C:
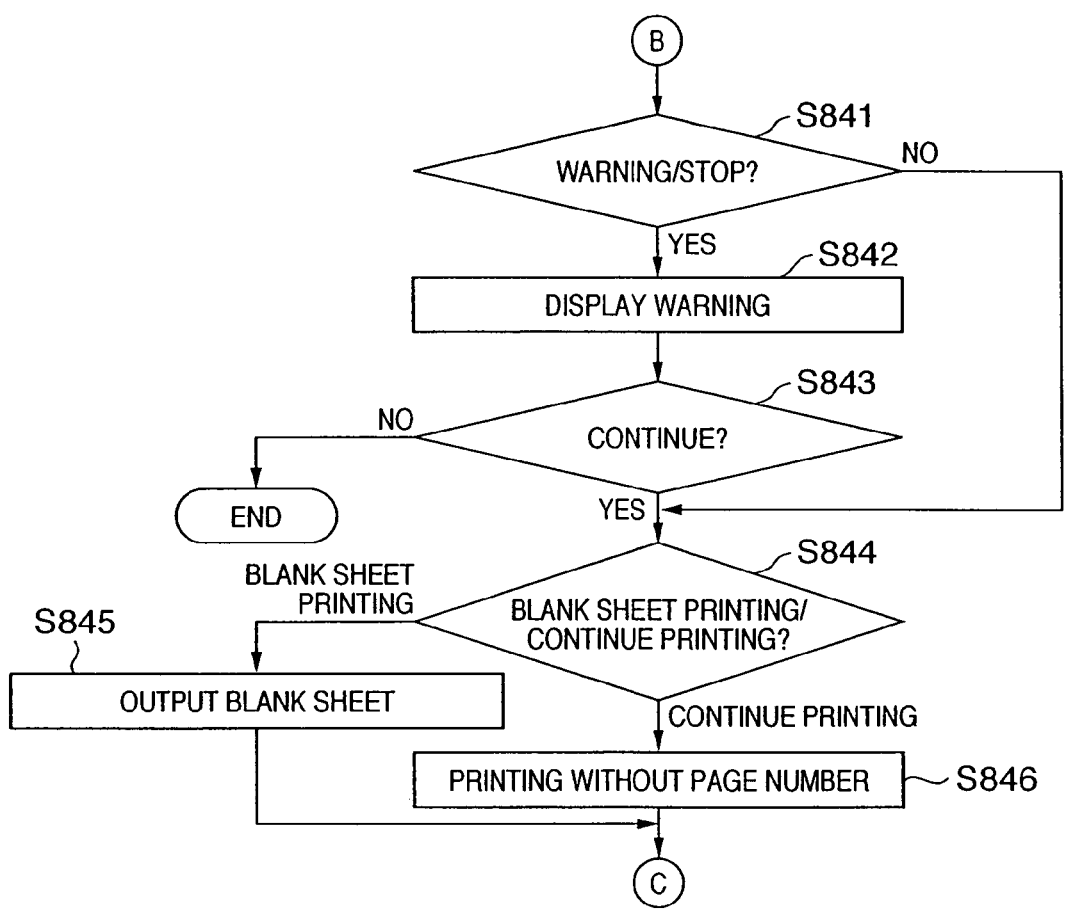

Next, the operation when the "recording of page number with total number of pages" is set will be described with reference to the flowcharts of FIGS. 13A to 13C. Note that in the following description, printing is performed for two copies based on five A4-sized documents. The print settings are made via the above-described user interface such that page print is performed in middle size (12 point) and the "recording of page number with total number of pages" is performed at the lower center portion of the page.

When the documents have been set on the document feeding unit 101 and the "Start" key 241 has been depressed, the process proceeds to step S801. At step S801, as the "recording with total number of pages" is ON, the process proceeds to step S802, at which it is determined whether or not the automatic mode is set. As described above, as the current mode is the automatic mode, the process proceeds to step S806, at which the document counter 305 sets the number of documents to "0". Then the process proceeds to step S807, at which the read-in controller 301 reads the first document image and stores the image into the image memory 120. When the reading of the document image has been completed, the process proceeds to step S808, at which the count value of the document counter 305 is incremented by "1" (+1). Accordingly, when the first document image has been read, the number of documents becomes "1". Next, the process proceeds to step S809, at which it is determined whether or not the document reading has been completed. When there is no document set on the document feeding unit 101, the read-in controller 302 determines that the document reading has been completed. As the number of documents set on the document feeding unit 101 is five, when the fifth document has been read, there is no document on the document feeding unit 101, then it is determined that the document reading has been completed and the process proceeds to step S810. At this time, the count value of the document counter 305 is "5".

Note that in a case where the document feeding unit 101 is not attached to the apparatus and upon duplication by placing the documents on the glass plate 102 one by one, the operation is as follows.

When one of the documents has been placed on the glass plate 102 and the "Start" key 241 has been depressed, the process proceeds to step S801. At step S801, as the "recording with total number of pages" is ON, the process proceeds to step S802, at which it is determined whether or not the automatic mode is set. As described above, as the current mode is the automatic mode, the process proceeds to step S806, at which the document counter 305 sets the number of documents to "0". Then the process proceeds to step S807, at which the document image is read and stored into the storage memory of the image memory 120 under the control of the read-in controller 301. When the document image has been read, the process proceeds to step S808, at which the total number of pages at the document counter 305 is incremented by "1" (+1). Accordingly, when the first document image has been read, the total number of pages is "1". Next, the process proceeds to step S809, at which it is determined whether or not the document reading has been completed. As reading is performed from the glass plate 102, the read-in controller 301 displays the screen shown in FIG. 14A and determines whether or not a "reading completed" key 7-12-1 is depressed or whether or not the "Start" key 241 is depressed. If the "Start" 241 is depressed, as the document reading is continued, it is determined that the document reading has not been completed, and the process returns to step S807. Note that the first document was replaced with the next document before the "Start" key 241 has been depressed. As the number of documents is five, when the fifth document has been read, the user depresses the "reading completed" key 7-12-1. It is determined based on the depression of the "reading completed" key 7-12-1 that the document reading has been completed, the process proceeds to step S810. At this time, the count value of the document counter 305 is "5".

As described above, when the document reading has been completed, the process proceeds to step S810, at which the total page setting unit 306 sets the number of documents at this time as the total number of pages, and the current page counter 307 sets the print start number N ("1" in this example) set via the interface as shown in FIG. 11A as the current page number. At step S811, the document image for one page read at step S807 is combined with the image of page number with total number of pages. That is, the read-out controller 302 reads the first-page document image from the storage memory of the image memory 120 and draws the image on the layout memory, and the page description combining unit 303 determines the description of page number with total number of pages using the current page number set at the current page counter 307 and the total number of pages set at the total page setting unit 306, and draws the description on the layout memory. As described above, the total number of pages obtained by the document counter 305 and the total page setting unit 306 is five and the current page number is N (=1) upon printing of the first page, the page number with the total number of pages ("1/5") is combined in the position designated via the user interface in FIG. 10D (the lower center of the document image).

Thereafter, the process proceeds to step S812, at which the output controller 304 print-outputs the image drawn on the layout memory by the printer 2. At step S813, the count value of the output page counter 308 (the number of print pages) is incremented. At this time, the apparatus produces an output result where an image "1/5" as an additional image corresponding to the information of page number with total number of pages, with the first-page document image, is printed on recording paper, as the first page of the first copy.

Next, the process proceeds to step S814, at which the completion determination unit 309 determines whether or not the printing for the first copy has been completed based on the current page number and the total number of pages. As the printing is performed for the first copy, the total number of pages is "5", and the number of printed pages, i.e., the number of output pages is "1", it is determined that the printing for the first copy has not been completed. Accordingly, the process proceeds to step S815. At step S815, the current page number of the current page counter 307 is incremented by "1" (+1). Next, at step S817, it is determined whether or not the printing has been completed based on the number of output pages, the total number of pages and the number of copies. As five images have been read (i.e., the total number of pages is "5"), the number of copies is "2", and the current number of output pages is "1", it is determined that the printing has not been completed. The process returns to step S811. The above processing is repeated, thereby an additional image "2/5" is printed, with the second-page document image, on recording paper as the second page of the second copy. Then, an additional image "3/5" is printed, with the third-page document image, on recording paper as the third page of the first copy. Then, an additional image "4/5" is printed, with the fourth-page document image, on recording paper as the fourth page of the first copy. Then, an additional image "5/5" is printed, with the fifth-page document image, on recording paper as the fifth page of the first copy. Thus, a series of output results having additional images "1/5" to "5/5" can be obtained.

When the "5/5" page has been printed at step S812, and the number of output pages is incremented at step S813, the number output pages becomes "5". As the total number of pages is "5" and the number of output pages is "5", it is determined at step S814 that the printing for the first copy has been completed. As a result, the process proceeds to step S816, at which the current page counter 307 resets the current page number to the initially-set print start number N (=1) in response to notification from the completion determination unit 309. Next, the process proceeds to step S817, at which it is determined whether or not the printing has been completed. In the case where five images have been read and the number of copies is "2", it is determined that the printing has not been completed since the number of output pages is "5". The process returns to step S811.

Thus, as for the second copy, as in the case of the first copy, an additional image "1/5" is printed with the first-page document image on the first-page recording paper, then an additional image "2/5" is printed with the second-page document image on the second-page recording paper, then an additional image "3/5" is printed with the third-page document image on the third-page recording paper, then an additional image "4/5" is printed with the fourth-page document image on the fourth-page recording paper, and an additional image "5/5" is printed with the fifth-page document image on the fifth-page recording paper. When the "5/5" page of the second copy has been printed, as the current page number is "5", it is determined at step S814 that printing for one copy has been completed. Further, at step S817, as the number of output pages is "10", it is determined that output for total number of pages× set number of copies has been completed, therefore it is determined that the printing has been completed, and the process ends.

Next, the processing for the "recording of page number with total number of pages" in the manual mode will be described. In the following description, page printing is performed in middle size (12 point) and printing with total number of pages is performed in a lower central position.

In the case of manual mode, prior to the depression of the "Start" key 241, the print start number N and the total number of pages M are designated via the interface described in FIG. 11B. In the following description, N=1 and M=3 hold. Note that these settings are made by turning the key 7-5-2 OFF thereby selecting "manual", and by using the keys 7-5-1 and 7-6-1 and the ten keys.

After the above setting, when a document has been placed on the glass plate 102 and the copy start key 241 has been depressed, the process proceeds to step S801. At step S801, as the printing with the total number of pages is ON, the process proceeds to step S802, at which it is determined that the current mode is the automatic mode. As the manual mode is set, the process proceeds to step S820, at which the total page setting unit 306 sets the number of total pages to M ("3" in the above setting), and the current page counter 307 sets the current page number to N ("1" in the above setting). Next, the apparatus performs image reading at steps S821 to S824 in parallel with printing at steps S825 to S833. That is, in the case of manual mode, as the total number of pages has been previously set, page number description can be generated using the previously-set total number of pages. Accordingly, print processing can be started immediately after the storage of document image for one page.

Upon document image reading, first, at step S821, the document counter 305 sets the number of documents to "0". Then at step S822, the document image is read and stored into the image memory 120 by the read-in controller 301. When the document image has been read, the process proceeds to step S823, at which the count value of the document counter 305 is incremented by "1" (+1). Next, the process proceeds to step S824, at which the read-in controller 301 determines whether or not all the documents have been read. If it is determined that all the documents have not been read, the process returns to step S821, at which the next document is read. Note that the determination at step S824 is made as follows. When documents are read by using the document feeding unit 101, it is determined that document reading has been completed when all the documents set on the document feeding unit 101 have been read (when there is no document on the document feeding unit 101). When documents are placed on the glass plate 102 and duplicated one by one, the user interface as shown in FIG. 14A is presented as in the case of the above automatic mode, such that the user explicitly notifies the completion of document reading by depressing the "reading completed" key 7-12-1.

Thus, when the document images have been stored in the memory and at least document image for one page to be print-outputted next has been stored, print processing is started by the read-out controller 302, the page description combining unit 303, and the output controller 304. First, at step S825, the read-out controller 302 waits until document image for one page to be print-outputted next has been stored into the image memory 120. When the document image has been stored, the process proceeds to step S826, at which the total number of pages (3) set at step S820 is compared with the current page number at the current page counter 307. If total number of pages≧current page number holds, the process proceeds to step S827, at which the document image to be print-outputted is combined with the page number image. That is, the read-out controller 302 reads the document image stored in the storage memory and draws the image on the layout memory, and the page description combining unit 303 determines page description from the total number of pages and the current page number and draws the page description on the layout memory. At step S828, the output controller 304 causes the printer 2 to print-output the combined image on the layout memory. At step S829, the count value of the output counter 308 is incremented by "1" (+1). On the other hand, at step S826, if the current page number is greater than the total number of pages, the process proceeds to step S841. The processing at steps S841 to S846 will be described later.

At step S830, the completion determination unit 309 determines whether or not printing for one copy has been completed. In this example, it is determined that printing for one copy has been completed when document reading has been completed and an integral multiple of the number of document pages=number of output pages holds. If it is determined that printing for one copy has not been completed, the process proceeds to step S831, at which the current page number is incremented by "1" (+1), and the process proceeds to step S833. On the other hand, if it is determined that printing for one copy has been completed, the current page number is reset to N, and the process proceeds to step S833.

At step S833, the completion determination unit 309 determines whether or not the printing has been completed. The determination of completion of printing is made by determining whether or not the number of output pages has becomes the number of documents×the set number of copies. As the printing has been performed for the first page, the process returns to step S825.

By the above processing, the "2/3" and "3/3" pages are printed, then printing for the forth page is performed. In this example, as the current page number is greater than the total number of pages at step S826, the process proceeds to step S841.

The processing at steps S841 to S846 is performed mainly by the page description combining unit 303. First, at step S841, the setting for warning/stop or continuation of operation is referred to. As shown in FIG. 11B, the setting is made by using the button 7-6-2. If the setting for warning/stop is made, the process proceeds to step S842, at which a warning display as shown in FIG. 14B is produced. In this display, if a "Stop" key 7-13-1 is depressed, the process ends from step S843, and the operation itself is stopped. If a "Continue" key 7-13-2 or a "Blank page" key 7-13-3 is depressed, it is determined that the operation is continued, and the process proceeds to step S844. If the "Blank page" key 7-13-3 is depressed, a blank page is outputted at step S845, and the process proceeds to step S829. This processing is realized by clearing the layout memory by the page description combining unit 303. In a case where the number of total page is three, the number of actual document pages is five, and the number of copies is two, two copies of "1/3", "2/3", "3/3", blank page, and blank page, are outputted. By the output of blank page(s), the user can clearly recognizes that the set total number of pages does not correspond with the number of read document pages, and wasteful use of recording paper can be prevented.

On the other hand, if the "Continue" key 7-13-2 is depressed, the process proceeds to step S846, at which the document image is print-outputted without page number description, and the process proceeds to step S829. This processing is realized by nonexecution of page description drawing by the page description combining unit 303. By this processing for a case where the number of total page is three, the number of actual document pages is five, and the number of copies is two, two copies of "1/3", "2/3", "3/3", the forth-page document image (without page number description), and the fifth-page document image (without page number description), are outputted.

As described above, according to the present embodiment, the apparatus having an image memory for storage of images, counts the number of images while reading and storing document images into the image memory. Accordingly, time and labor required for manual counting of pages can be omitted, and the occurrence of paper jam can be reduced. Further, human error such as miscount can be prevented.

Further, in the above embodiment, upon "recording of page number with total number of pages", the automatic mode in which the total number of documents is counted and used as the total number of pages, or the manual mode in which the total number of documents is manually inputted previously and is used as the total number pages, is selected. Accordingly, the merit of the manual mode by manual setting of the total number of pages can be ensured. For example, when the manual mode is adopted, document reading and printing can be performed in parallel, and the processing speed can be improved. Further, in the manual mode, as the total number of pages can be intentionally set to a number different from the number of documents, it may be arranged such that a work is shared by plural copier and the printed results are collected. That is, in an environment where two or more copiers can be utilized, the documents are divided for the plural copiers thereby the processing efficiency can be improved. In this case, such work sharing can be realized by independently designating the total number of pages and the start page number. For example, the total number of pages is set to "50" in two copiers A and B, and the page start numbers are set to "1" and "26" in the copiers A and B, thereby the first half 25 documents can be processed by the copier A while the last half 25 documents can be processed by the copier B. Thus the "recording of page number with total number of pages" can be performed. In this manner, as the automatic mode and the manual mode are selectively provided, miscount of the number of documents can be prevented, and the arrangement for work sharing can be realized.

Further, as the apparatus has the image memory, the "recording of page number with total number of pages" can be realized by sequentially reading document images and storing the image memory.

Note that in the above embodiment, a character image is combined on the memory, however, the combining is not limited to this arrangement. The page description is not necessarily combined on the memory, but may be combined in any way as long as it is combined with a finally formed document image. For example, the character image may be combined by hardware upon printing.

Further, it may be arranged such that the programs for execution of the respective flowcharts in the embodiment and the programs related to operation control may be installed from the outside. In this case, the above-described image forming apparatus or an external device such as a host computer which transmits print data to the image forming apparatus executes the programs. Further, in this case, it may be arranged such that data to display operation screens similar to those described in the embodiment is installed from the outside, to provide various user interface screens on the display unit of the external device. The present invention is applicable to a case where an output device is provided with an information group including programs from an external storage medium such as a CD-ROM, a flash memory or an FD or via a network.

As described above, the object of the present invention can also be achieved by providing a storage medium holding software program code for performing the aforesaid functions of the embodiment to a system or an apparatus, reading the program code with a computer (e.g., CPU, MPU) of the system or apparatus from the storage medium then executing the program.

In this case, the program code read from the storage medium realizes the functions according to the embodiment, and the storage medium holding the program code constitutes the invention.

Accordingly, so long as the system or apparatus has the functions of the program, the program may be executed in any form, such as an object code, a program executed by an interpreter, or script data supplied to an operating system.

Example of storage media that can be used for supplying the program are a flexible disk, a hard disk, an optical disk, a magneto-optical disk, an MO, a CD-ROM, a CD-R, a CD-RW, a magnetic tape, a non-volatile type memory card, a ROM, and a DVD.

In this case, the program code read from the storage medium realizes the functions according to the embodiment, and the storage medium holding the program code constitutes the invention.

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server or an ftp server which downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

The present invention can be applied to a system constituted by a plurality of devices or to an apparatus comprising a single device. Further, the present invention can be applied to a case where a program is supplied to a system or apparatus. In this case, the system or apparatus can attain the advantages of the present invention by reading the program represented by software to realize the invention from a storage medium to the system or apparatus.

The present invention is not limited to the above-described embodiment, but various modifications (including organic combination thereof) can be made based on the subject matter of the present invention. The modifications are not eliminated from the scope of the present invention.

The embodiment and various examples of the present invention have been described, however, it is apparent for those skilled in the art that the subject matter and scope of the present invention are not limited to specific descriptions in the specification.

For example, a printer driver may be provided with the above-described page print function. That is, the present invention is applicable to an information processing apparatus (host computer) which is capable of transmitting print data and in which a printer driver has the above-described page print function. The page print function can be designated as print setting for image data to be transmitted from the host computer to an image forming apparatus (printer). In this case, operation screens similar to the various operation screens described in the above embodiment are displayed as printer-driver operation screens on a display unit. Further, various users' instructions similar to those described in the above embodiment (e.g., the instruction to perform total page print in the above-described page print function, and the instruction to select the manual mode or the automatic mode upon execution of the total page print, the instruction to determine execution/nonexecution of warning/stop at step S841 in FIG. 13C, and the instruction to determine execution/nonexecution of blank page print/continuation of printing at step S844 in FIG. 13C) can be received on the host computer side via the printer driver or the like. Thus, an image forming system may be constructed so as to perform processing, in correspondence with an instruction inputted from a user via a setting screen at the host computer, on image data (job) transmitted from the host computer, and to realize controls similar to those in the above embodiment. In this manner, various modifications of the present invention can be made.

As described above, according to the present invention, in an image forming apparatus or system capable of applying additional information such as total number of pages and/or page number of a job to output results, the problems in the conventional art upon generation of such output results (e.g., the problem of productivity, the problem of deterioration of document, and the problem of misprint) can be solved. Further, upon generation of such output results, generation of inappropriate output result can be prevented, and correctness and reliability of output results can be improved. Further, the operability for the user upon generation of output result can be improved. Further, in the apparatus or the system, the occurrence of problem of generation of user's unintended output result due to arrangements for improvement in productivity can be prevented. Further, upon generation of output result, as wasteful operations of the apparatus can be disabled, thereby the load on the apparatus can be reduced. Further, upon generation of output results by the image forming apparatus or system capable of applying additional information such as total number of pages and/or page number of a job to output results, plural advantages in balance, including at least any of the above-described advantages, can be attained. For example, in duplication processing to record page number including the total number of documents, the document feeding only for the purpose of counting the number of documents, prior to the start of duplication, or the manual input of the total number of documents, can be omitted, and recording of correct page number and rapid duplication can be realized. Upon generation of output result by the image forming apparatus or system capable of applying additional information such as total number of pages and/or page number of a job to output results, it is possible to meet users' various needs in a flexible manner.

The present invention is not limited to the above embodiments and various changes and modifications can be made within the spirit and scope of the present invention. Therefore, to appraise the public of the scope of the present invention, the following claims are made.

CLAIM OF PRIORITY

This application claims priority from Japanese Patent Application No. 2004-224580 filed on Jul. 30, 2004, which is hereby incorporated by reference herein.

What is claimed is:

1. A printing apparatus comprising:
   an input unit constructed to input a plurality of images;
   a print unit constructed to print the plurality of images input by said input unit on a plurality of sheets;
   a reception unit constructed to receive number of pages from a user; and
   a control unit constructed to control said print unit to:

print both an image input by said input unit and the number of pages received by said reception unit on a sheet, if the page number of a page corresponding to the image is not greater than the number of pages;

print an image input by said input unit without printing the number of pages received by said reception unit on a sheet, if the page number of a page corresponding to the image is greater than the number of pages; and print an image, the number of pages received by said reception unit, and a page number of a page corresponding to the image, if the page number of the page corresponding to the image is not greater than the number of pages received by said reception unit.

2. The apparatus according to claim 1 wherein said control unit is constructed to control said print unit to print an image without the number of pages received by said reception unit, and a page number of a page corresponding to the image, if the page number of the page corresponding to the image is greater than the number of pages received by said reception unit.

3. The apparatus according to claim 1, further comprising a warning unit constructed to warn a user when said input unit inputs images whose number of pages is greater than the number of pages received by said reception unit.

4. The apparatus according to claim 1, further comprising a setting unit constructed to set whether or not to print an image whose page number is greater than the number of pages received by said reception unit, wherein said control unit is further constructed to control the print unit:

to print an image input by said input unit without printing the number of pages received by said reception unit on a sheet, if the page number of the page corresponding to the image is greater than the number of pages received by said reception unit, in a case where said setting unit sets to print an image whose page number is greater than the number of pages; and not to print both an image input by said input unit and the number of pages received by said reception unit, if the page number of the page corresponding to the image is greater than the number of pages, in a case where said setting unit sets not to print an image whose page number is greater than the number of pages received by said reception unit.

5. A control method of a printing apparatus comprising:
an input step of inputting a plurality of images;
a reception step of receiving number of pages from a user; and
a control step of controlling the print apparatus:
to print both an image input in the input step and the number of pages received in the reception step on a sheet, if the page number of a page corresponding to the image is not greater than the number of pages; and
to print an image input in the input step without printing the number of pages received in the reception step on a sheet, if the page number of a page corresponding to the image is greater than the number of pages.

6. A computer readable medium storing a control program causing a computer to execute a printing control method comprising:

an input step of inputting a plurality of images;
a reception step of receiving number of pages from a user; and
a first printing step of printing both an image input in the input step and the number of pages received in the reception step on a sheet, if the page number of a page corresponding to the image is not greater than the number of pages; and a second printing step of printing an image input in the input step without printing the number of pages received in the reception step on a sheet, if the page number of a page corresponding to the image is greater than the number of pages.

7. A printing apparatus comprising:
an input unit constructed to input a plurality of images;
a print unit constructed to print the plurality of images input by said input unit;
a reception unit constructed to receive number of pages from a user; and
a control unit constructed to control said print unit to:
print an image input by said input unit and the number of pages received by said reception unit on each page whose page number is not greater than the number of pages received by said reception unit, and
print an image input by said input unit without printing the number of pages received by said reception unit, on each page after a page whose page number is equal to the number of pages received by said reception unit.

8. A printing apparatus comprising:
an input unit constructed to input a plurality of images;
a print unit constructed to print the plurality of images input by said input unit;
a reception unit constructed to receive number of pages from a user; and
a control unit constructed to control said print unit to:
print an image input by said input unit, page number of a page corresponding to the image and the number of pages received by said reception unit, on each page whose page number is not greater than the number of pages received by said reception unit, and
print an image input by said input unit without printing page number of a page corresponding to the image and the number of pages received by said reception unit, on each page after a page whose page number is equal to the number of pages received by said reception unit.

9. The apparatus according to claim 8, wherein said input unit inputs images, the number of which is greater than the number of pages received by said reception unit.

10. A printing apparatus comprising:
an input unit constructed to input a plurality of images;
a print unit constructed to print the plurality of images input by said input unit;
a setting unit constructed to set last page number which is page number to be last printed; and
a control unit constructed to control said print unit to:
print an image input by said input unit, page number of a page corresponding to the image and the last page number set by said setting unit, on each page whose page number is not greater than the last page number set by said setting unit, and
print an image input by said input unit without printing page number of a page corresponding to the image and the last page number set by said setting unit, on each page after a page whose page number is equal to the last page number set by said setting unit.

11. The apparatus according to claim 10, wherein said setting unit receives the last page number from a user, to set the last page number.

12. A printing apparatus comprising:
an input unit constructed to input a plurality of images;
a print unit constructed to print the plurality of images input by said input unit;

a reception unit constructed to receive number of pages from a user; and a control unit constructed to control said print unit to:

print an image input by said input unit and page number of a page corresponding to the image, on each page whose page number is not greater than the number of pages received by said reception unit, and print an image input by said input unit without printing page number of a page corresponding to the image, on each page after a page whose page number is equal to the number of pages received by said reception unit.

13. A printing apparatus comprising:

an input unit constructed to input a plurality of images;

a print unit constructed to print the plurality of images input by said input unit;

a setting unit constructed to set last page number which is page number to be last printed; and a control unit constructed to control said print unit to:

print an image input by said input unit and page number of a page corresponding to the image, on each page whose page number is not greater than the last page number set by said setting unit, and print an image input by said input unit without printing page number of a page corresponding to the image, on each page after a page whose page number is equal to the last page number set by said setting unit.

14. A printing apparatus comprising:

an input unit constructed to input a plurality of images;

a print unit constructed to print the plurality of images input by said input unit;

a reception unit constructed to receive start page number which is page number to be first printed and last page number which is page number to be last printed, from a user; and a control unit constructed to control said print unit to print an image input by said input unit and each page number between the start page number received by said reception unit and the last page number received by said reception unit, on each page, and controls said print unit to print image input by said input unit without printing page number, on each page after a page whose page number is equal to the last page number.

15. An information processing apparatus that can transmit print data to a printing apparatus comprising:

a reception unit constructed to receive number of pages from a user; and a transmitting unit constructed to transmit to the printing apparatus print data for causing the printing apparatus to print an image and page number of a page corresponding to the image, on each page whose page number is not greater than the number of pages received by said reception unit, and print an image without printing page number of a page corresponding to the image, on each page after a page whose page number is equal to the number of pages received by said reception unit.

16. The apparatus according to claim 15, wherein said transmitting unit transmits to the printing apparatus print data for causing the printing apparatus to print an image, page number of a page corresponding to the image and the number of pages received by said reception unit on each page whose page number is not greater than the number of pages received by said reception unit, and print an image without printing page number of a page corresponding to the image and the number of pages received by said reception unit, on each page after a page whose page number is equal to the number of pages received by said reception unit.

17. An information processing apparatus which can transmit print data to a printing apparatus comprising:

a setting unit constructed to set last page number which is page number to be last printed; and a transmitting unit constructed to transmit to the printing apparatus print data for causing the printing apparatus to print an image and page number of a page corresponding to the image, on each page whose page number is not greater than the last page number set by said setting unit, and print an image without printing page number of a page corresponding to the image, on each page after a page whose page number is equal to the last page number set by said setting unit.

18. The apparatus according to claim 17, wherein said transmitting unit transmits to the printing apparatus print data for causing the printing apparatus to print an image, page number of a page corresponding to the image and the last page number set by said setting unit, on each page whose page number is not greater than the last page number set by said setting unit, and print an image without printing page number of a page corresponding to the image and the last page number set by said setting unit, on each page after a page whose page number is equal to the last page number set by said setting unit.

* * * * *